United States Patent
Liberg et al.

(10) Patent No.: US 12,107,778 B2
(45) Date of Patent: Oct. 1, 2024

(54) METHOD AND DEVICES FOR SCHEDULING TRANSMISSIONS OF CARRIERS TO NARROWBAND INTERNET OF THINGS CELLS

(71) Applicant: Telefonaktiebolaget LM Ericsson (publ), Stockholm (SE)

(72) Inventors: Olof Liberg, Enskede (SE); Yi-Pin Eric Wang, Fremont, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 389 days.

(21) Appl. No.: 17/608,074

(22) PCT Filed: May 3, 2019

(86) PCT No.: PCT/SE2019/050394
§ 371 (c)(1),
(2) Date: Nov. 1, 2021

(87) PCT Pub. No.: WO2020/226537
PCT Pub. Date: Nov. 12, 2020

(65) Prior Publication Data
US 2022/0278785 A1  Sep. 1, 2022

(51) Int. Cl.
*H04L 5/00* (2006.01)
*G16Y 10/75* (2020.01)
*G16Y 30/00* (2020.01)

(52) U.S. Cl.
CPC ............ *H04L 5/0007* (2013.01); *G16Y 10/75* (2020.01); *G16Y 30/00* (2020.01); *H04L 5/0048* (2013.01)

(58) Field of Classification Search
CPC ..... H04L 5/0007; H04L 5/0048; H04L 5/001; G16Y 10/75; G16Y 30/00; Y02D 30/70; H04W 4/70; H04W 28/16
(Continued)

(56) References Cited

U.S. PATENT DOCUMENTS

2018/0097596 A1  4/2018 Palaniveli et al.
2018/0376484 A1* 12/2018 Beale .................. H04W 48/20
(Continued)

OTHER PUBLICATIONS

CMCC, "Discussion on Carrier Aggregation in RAN2", 3GPP TSG-RAN WG2 Meeting #65bis, Seoul, Korea, Mar. 23, 2009, pp. 1-4, R2-092411, 3GPP.

*Primary Examiner* — Candal Elpenord
(74) *Attorney, Agent, or Firm* — COATS & BENNETT, PLLC

(57) ABSTRACT

Disclosed is a method for scheduling transmissions of multiple carriers from a single transmitting network node (10; 100) for multiple Narrow Band Internet of Things (NB-IoT) cells, (50). The multiple carriers comprising a respective cell specific anchor carrier having NB-IoT sub-frames allocated for the transmission of mandatory information related to the functionality of the specific cell. The method comprises scheduling (S1) at least two cell specific anchor carriers using time interleaved transmissions that enables NB-IoT sub-frames belonging to different cell specific anchor carriers, and being allocated for the transmission of the mandatory information, to be transmitted at non-overlapping times. Also disclosed is a network device configured to perform the method and a computer program which when executed schedules at least two cell specific anchor carriers using time interleaved transmissions that enables NB-IoT sub-frames belonging to different cell specific anchor carriers and being allocated for the transmission of the mandatory information to be transmitted at non-overlapping times.

20 Claims, 14 Drawing Sheets

(58) Field of Classification Search
USPC .................................. 370/328–330, 329–330
See application file for complete search history.

(56) References Cited

U.S. PATENT DOCUMENTS

| | | |
|---|---|---|
| 2019/0045372 A1 | 2/2019 | Niu et al. |
| 2019/0045553 A1* | 2/2019 | Zhang .................. H04W 68/02 |
| 2019/0364408 A1* | 11/2019 | Park .................. H04W 72/1273 |

* cited by examiner

ANCHOR CARRIER 1

ANCHOR CARRIER 2

ANCHOR CARRIER 3

ANCHOR CARRIER 4

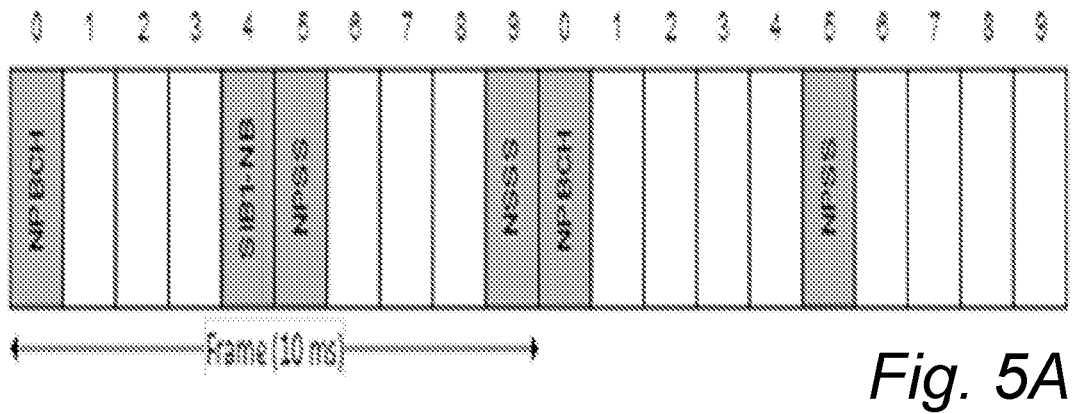
Fig. 5A
Fig. 5B
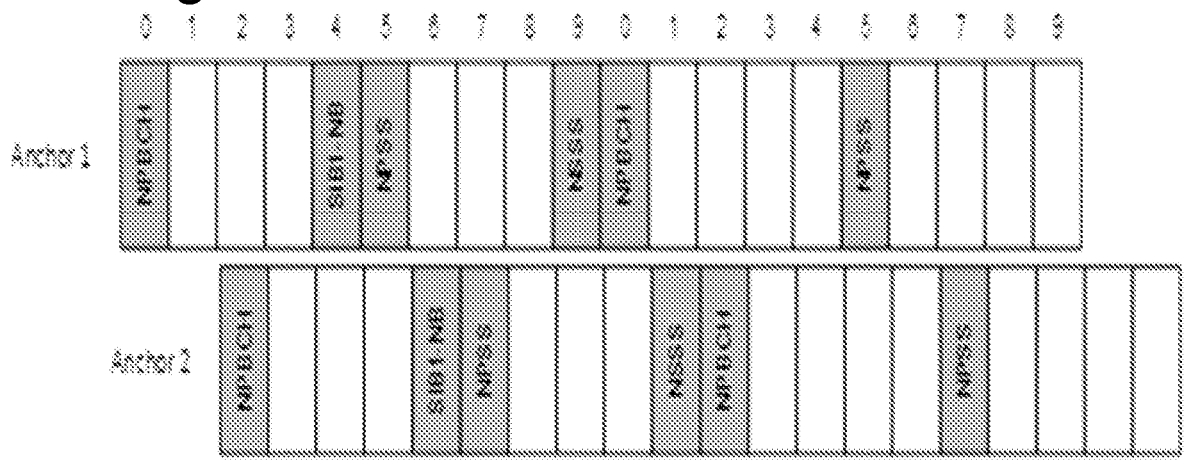
Fig. 5C
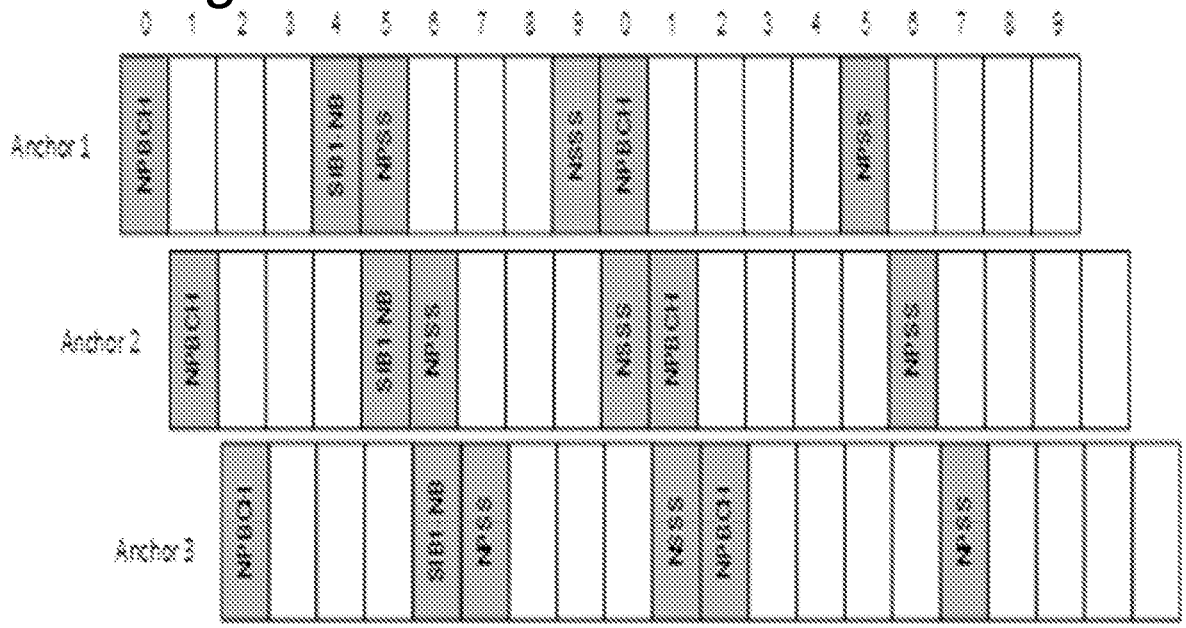

METHOD AND DEVICES FOR SCHEDULING TRANSMISSIONS OF CARRIERS TO NARROWBAND INTERNET OF THINGS CELLS

TECHNICAL FIELD

The proposed technology generally relates to methods, devices and computer programs for scheduling transmissions of multiple carriers from a single transmitting network node for multiple Narrow Band Internet of Things cells.

BACKGROUND

Narrow Band Internet of Things, NB-IoT is a developed radio access technology. This radio access technology is dedicated for cellular Internet of Things, IoT, and provides connectivity to services and applications that demand qualities such as reliable indoor coverage and high capacity in combination with low system complexity and optimized power consumption. To deliver a maximal deployment flexibility NB-IoT supports three basic mode of operations. In stand-alone operation NB-IoT may operate as a standalone system in dedicated spectrum. In guard band operation NB-IoT is instead located within the guard-band of a Long Term Evolution carrier, LTE carrier. In in-band operation NB-IoT may be deployed on resource blocks within a normal LTE carrier. NB-IoT also supports operation within a New Radio carrier, NR carrier, preferably by using the configuration specified for guard-band mode.

The minimum system bandwidth in NB-IoT is 200 kHz. In such a basic setup a NB-IoT anchor carrier is transmitted in the cell. It supports basic cellular functionality such as synchronization, broadcast of system information, data transmission, as well as paging and random access. The synchronization is supported by Narrowband Primary Synchronization Signals, NPSS and Secondary Synchronization Signals, NSSS. The Narrowband Physical Broadcast Channel, NPBCH, supports transmission of the Master Information Block, while the Narrowband Physical Downlink Shared Channel, NPDSCH, supports transmission of the narrowband system information messages, SI messages. A mapping of the physical channels and signals on the anchor carrier is schematically illustrated in FIG. 5A, which illustrates a particular mapping of NPSS, NSSS, NPBCH and SIB1-NB on two radio frames in the anchor carrier. To facilitate operation within a Long Term Evolution network, LTE network, the carrier sub-frames that are used by NB-IoT are indicated as NB-IoT sub-frames. This indication may be done through a broadcasted bitmap having, e.g., a length of 20 or 40 bits. Each specific bit corresponds to a sub-frame. If a specific bit is set the corresponding sub-frame is considered to be a NB-IoT sub-frame. If the bit is not set, the sub-frame is in turn not intended to be used for NB-IoT transmissions. In case of NB-IoT sub-frames certain sub-frames in the anchor carrier is generally used for the transmission of NPSS, NSSS, NPBCH and SIB1-NB, while the remaining sub-frames in the anchor carriers are available for Narrowband Physical Downlink Control Channel, NPDCCH transmission and Narrowband Physical Downlink Shared Channel transmission, NPDSCH transmission. When cell specific anchor carriers are transmitted for multiple NB-IoT cells they all comprise signals that convey mandatory information related to the functionality of their specific NB-IoT cell. This information may e.g., be synchronization and system information. This mandatory cell specific information is regularly conveyed by corresponding signals that have certain sub-frames allocated for their transmission. The remaining sub-frames of the anchor carrier may be used to transmit signals that convey user data and, e.g., transmissions of signals related to paging and random access. In NB-IoT environments it is often the case that a single network node supports a large number of NB-IoT cells. That is, a single network node is responsible for providing more than one NB-IoT cells with cell specific, or cell defining, information that is mandatory for the workings of the NB-IoT cells. A particular issue with such a scenario is that the single network node that is transmitting several simultaneous NB IoT carriers, e.g., anchor carriers, may experience a highly varying power consumption. This is especially true for a network node that serves multiple cells and which needs to provide multiple anchor carriers in order to convey the mandatory cell specific functionality information. Consider for example the simple case of a 3-sector site in a terrestrial network where a single power supply may need to serve three transmission points. Further consider the case of a non-terrestrial network where a single satellite may need to serve hundreds of cells. Both of these scenarios require the transmitting node to simultaneously transmit a plurality of cell specific anchor carriers. This will in turn put some severe momentary strain on the power supply due to the fact that the information that is necessary for the cells to function will be transmitted within a very small time window. This may in turn lead to a degradation of the signal quality and may, if the number of cells are large, even lead to situations where the available power bound is saturated and further transmissions becomes impossible.

The proposed technology aims to provide mechanisms that at least counter some parts of the problem with the highly time varying demands that are put on a transmitting network node when transmitting multiple anchor carriers for multiple Narrow Band Internet of Things cells.

SUMMARY

It is an object to provide mechanisms that reduces the risk of having radio transmitted signals impaired or corrupted during the transmission of multiple carriers from a single transmitting network node for multiple Narrow Band Internet of Things cells. Such an impairment or corruption of the signal might result if the power source is not able to provide the instant need of the modulators and power amplifiers for the transmission of multiple carriers.

It is in particular an object of the proposed technology to provide a scheduling method that enables a controlled transmission of multiple carriers from a single transmitting network node for multiple Narrow Band Internet of Things cells. The transmission schedule enables control of the power demands of a network node that is transmitting the multiple carriers.

It is still another object of the proposed technology to provide a network device that is configured to schedule transmissions of multiple carriers from a single transmitting network node for multiple Narrow Band Internet of Things cells in order to reduce the risk of having radio transmitted signals impaired or corrupted when transmitted from a single transmitting network node for multiple Narrow Band Internet of Things cells.

It is yet another object of the proposed technology to provide a computer program that, when executed, schedules transmissions of multiple carriers from a single transmitting network node for multiple Narrow Band Internet of Things cells in order to order to reduces the risk of having radio transmitted signals impaired or corrupted during the transmission of multiple carriers from a single transmitting network node for multiple Narrow Band Internet of Things cells.

These and other objects are met by embodiments of the proposed technology.

According to a first aspect, there is provided method for scheduling transmissions of multiple carriers from a single transmitting network node for multiple Narrow Band Internet of Things (NB-IoT) cells. The multiple carriers comprising a respective cell specific anchor carrier having NB-IoT sub-frames allocated for the transmission of mandatory information related to the functionality of the specific cell. The method comprises scheduling at least two cell specific anchor carriers using time interleaved transmissions that enables NB-IoT sub-frames belonging to different cell specific anchor carriers, and being allocated for the transmission of the mandatory information, to be transmitted at non-overlapping times.

According to a second aspect there is provided a network device configured to schedule transmissions of multiple carriers from a single transmitting network node for multiple Narrow Band Internet of Things cells (NB-IoT cells), the multiple carriers comprising a respective cell specific anchor carrier having NB-IoT sub-frames allocated for the transmission of mandatory information related to the functionality of the specific cell. The network device is configured to schedule at least two cell specific anchor carriers for time interleaved transmissions that enables NB-IoT sub-frames belonging to different cell specific anchor carriers, and being allocated for the transmission of the mandatory information, to be transmitted at non-overlapping times.

According to a third aspect there is provided computer program for scheduling transmissions of multiple carriers from a single transmitting network node for multiple Narrow Band Internet of Things (NB-IoT) cells. The multiple carriers comprising a respective cell specific anchor carrier having NB-IoT sub-frames allocated for the transmission of mandatory information related to the functionality of the specific cell. The computer program comprises instructions, which when executed by at least one processor, cause the at least one processor to schedule at least two cell specific anchor carriers using time interleaved transmissions that enables NB-IoT sub-frames belonging to different cell specific anchor carriers and being allocated for the transmission of the mandatory information to be transmitted at non-overlapping times.

One of the advantages with the proposed technology is that it enables a transmitting network node to control resource demands such as power demand and modulation and power amplification resources. This will in turn reduce the risks that signals are impaired or corrupted during the transmission of multiple carriers from a single transmitting network node for multiple Narrow Band Internet of Things (NB-IoT) cells.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which:

FIG. 5A is an illustration of a typical sub-frame structure in an anchor carrier. It is illustrated how certain sub-frames are allocated for the transmission of certain signals.

FIG. 5B is a schematic representation of an embodiment of the proposed technology that illustrates a particular time interleaved transmission of two anchor carriers having sub-frames allocated for the transmission of certain signals.

FIG. 5C is a schematic representation of an embodiment of the proposed technology that illustrates a particular time interleaved transmission of three anchor carriers having sub-frames allocated for the transmission of certain signals.

DETAILED DESCRIPTION

Throughout the drawings, the same reference designations are used for similar or corresponding elements.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Figure 1A:
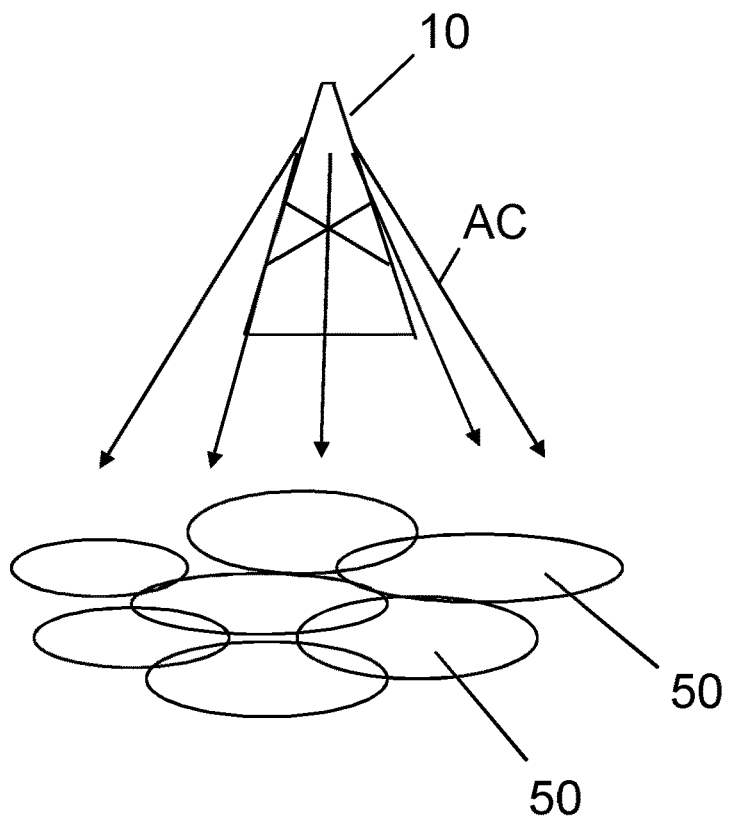
FIG. 1A is a schematic illustration of a network node in a terrestrial environment that is transmitting multiple anchor carriers for multiple cells.
Figure 1B:
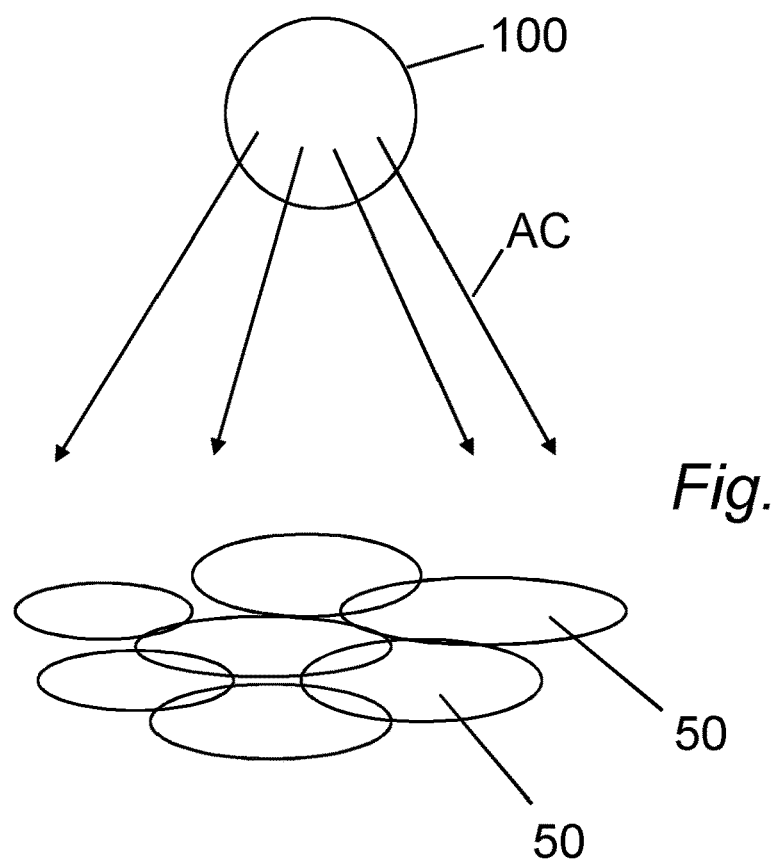
FIG. 1B is a schematic illustration of a network node in a non-terrestrial environment that is transmitting multiple anchor carriers for multiple cells.
Figure 2:
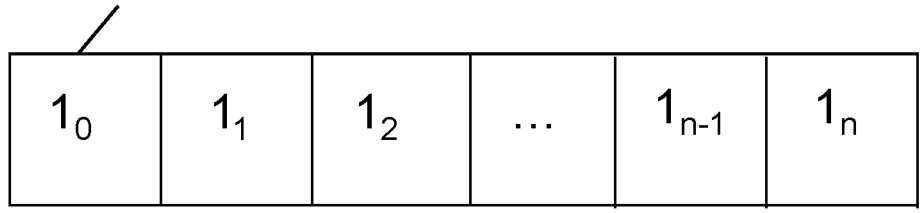
FIG. 2 is a schematic representation of the sub-frame structure of a number of anchor carriers.
Figure 2:
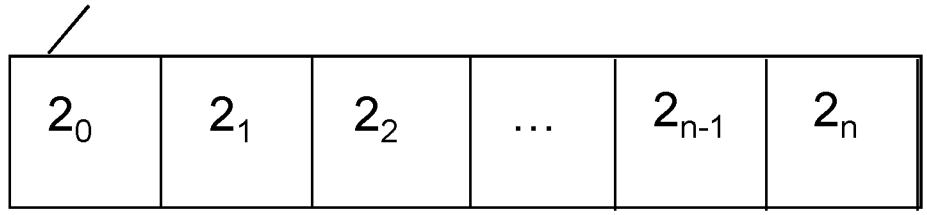
Figure 2:
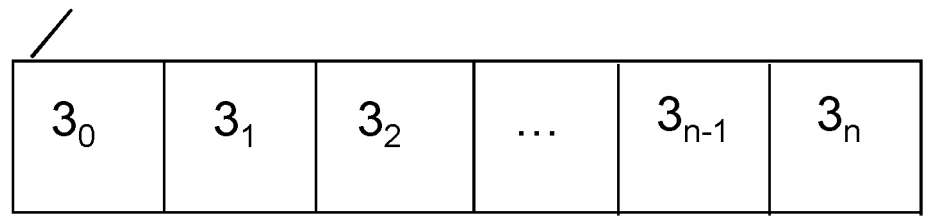
Figure 2:
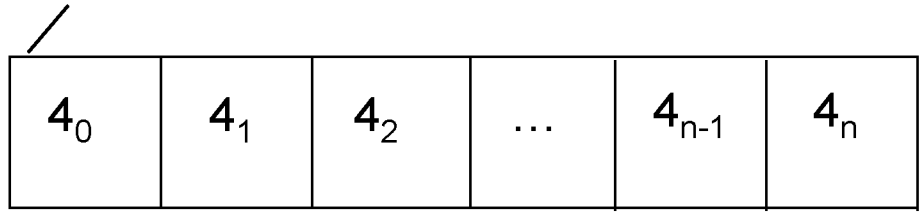

For a better understanding of the proposed technology, it may be useful to begin with a brief system overview and analysis of the technical problem. To this end reference is made to FIG. 1. FIG. 1A provides a schematic illustration of a network environment where a single transmitting node 10 transmits multiple anchor carriers, ACs, to a multiple NB-IoT cells 50. The different anchor carriers are cell specific and can be seen as a way to define the various cells, i.e., a particular anchor carrier may be considered to span a corresponding NB-IoT cell. In an environment such as the one depicted in FIG. 1A, where a single node serves several cells—potentially a very large number of cells—in the order of hundreds, the single transmitting node is responsible for providing all of the cells with basic cell functionality information conveyed through the cell specific anchor carriers. A particular scenario, when potentially hundreds of anchor carriers are needed is illustrated in FIG. 1B where a non-terrestrial network node, e.g., a satellite, is responsible for providing potentially hundreds of cell specific anchor carriers. A simultaneous transmission of these anchor carriers put a lot of demand on the network node power supply. Consider for example the case where a single network node is responsible for transmitting cell specific anchor carriers for four NB-IoT cells. A particular anchor carrier mapping for such a case is illustrated in FIG. 2 which illustrates four anchor carriers having a number n of sub-frames in a particular transmission frame. Some of the sub-frames in a cell specific anchor carrier are allocated for the transmission of mandatory information that is relevant for the basic functionality of the specific cell associated with the anchor carrier while the remaining sub-frames may be used for transmitting signals associated to other data, such as user specific data. FIG. 5A provides a concrete example of an anchor carrier mapping where a particular sub-frame—sub-frame 0—is allocated for NPBCH transmission, sub-frame four is allocated for SIB1 transmissions and sub-frame 5 and 9 are allocated for NPSS transmission and NSSS transmission, respectively. SIB1 transmissions uses every second subframe 4 and not every subframe 4. The frame spanned by the sub-frames are in this example 10 ms long.

Consider now the case where the first sub-frame in each anchor carrier, i.e., the sub-frame denoted $1_0$ in the first anchor carrier, $2_0$ in the second anchor carrier, $3_0$ in the third anchor carrier and $4_0$ in the fourth anchor carrier, is allocated for transmission of mandatory information that is relevant for the basic functionality of the specific cell associated with the respective anchor carrier. It is clear that a simultaneous transmission of the first sub-frame will put a lot of strain on the power supply of the transmitting network node since the power supply should feed four transmission points in the same narrow time span. There are in general several sub-frames allocated for transmission of such mandatory information in each anchor carrier, e.g., the zeroth, the fourth and the fifth sub-frame in each anchor carrier. So the problem associated the momentary power supply strain will be repeated for each of these allocated sub-frames. This leads to a highly time varying power consumption at the transmitting network node. This will in turn put a lot of demand on the power supply and the resources for modulation and power amplification even for a rather low number of anchor carriers, e.g., fewer than five, and will be amplified when the number of anchor carriers grows. Moreover, since the anchor carriers have a certain periodicity the above noted problems will be repeated during each anchor carrier transmission. The proposed technology aims to provide mechanisms that enables a more time balanced power consumption that avoids momentary power consumption peaks that may, for large number of anchor carriers, saturate the ability of the transmitting network node.

The proposed technology provides in brief terms a set of mechanisms that enables an averaging out of the power consumption, over time, in the case where a single transmitting network node serves multiple NB IoT cells. In its most basic version the proposed technology suggests a time interleaved transmission of cell specific anchor carriers in order to reduce the simultaneous occurrence of transmissions related to mandatory information that is relevant for the basic functionality of the specific cell associated with a cell specific anchor carrier. With time interleaved transmission of two or more anchor carriers is intended a transmission mode where certain sub-frames in the anchor carriers are transmitted at slightly different times with respect to each other. That is, there is a coordinated transmission whereby the transmission of certain sub-frames in an anchor carrier is offset in time relative corresponding sub-frames in other anchor carriers.

To counter at least part of the above mentioned drawbacks the proposed technology provides a method for scheduling transmissions of multiple carriers from a single transmitting network node 10; 100 for multiple Narrow Band Internet of Things cells (NB-IoT cells) 50. The multiple carriers comprising a respective cell specific anchor carrier having NB-IoT sub-frames allocated for the transmission of mandatory information related to the functionality of the specific cell. The method comprises scheduling S1 at least two cell specific anchor carriers using time interleaved transmissions that enables NB-IoT sub-frames belonging to different cell specific anchor carriers, and being allocated for the transmission of the mandatory information, to be transmitted at non-overlapping times. A schematic flow diagram illustrating the method is provided by FIG. 8A.

In other words the proposed technology suggests a scheduling method that will enable a controlled transmission of multiple anchor carriers for multiple Narrow Band Internet of Things cells, NB-IoT cells. The scheduling method is, in its most basic form, focused on obtaining a time interleaved transmission of the NB-IoT sub-frames that are allocated for the transmission of the mandatory information and belong to different anchor carriers. With time interleaved transmission is intended a specific transmission schedule whereby certain sub-frames belonging to different anchor carriers, i.e., anchor carriers for different NB-IoT cells, are transmitted at non-overlapping times. FIG. 5B provides a concrete illustration of two anchor carriers that have been scheduled using time interleaved transmissions. The anchor carriers have an identical sub-frame structure where particular sub-frame—sub-frame 0—is allocated for NPBCH transmission, the fourth sub-frame is allocated for SIB1 transmissions and sub-frame 5 and 9 are allocated for NPSS transmission and NSSS transmission, respectively. The time interleaved scheduling will ascertain that no transmission of these sub-frames occurs at the same time. This will reduce reduce the risk of having radio transmitted signals impaired or corrupted during the transmission of multiple carriers from a single transmitting network node for multiple Narrow Band Internet of Things cells. Such an impairment or corruption of the signal might result if the power source is not able to provide the instant need of the modulators and power amplifiers for the transmission of multiple carriers.

Figure 3:
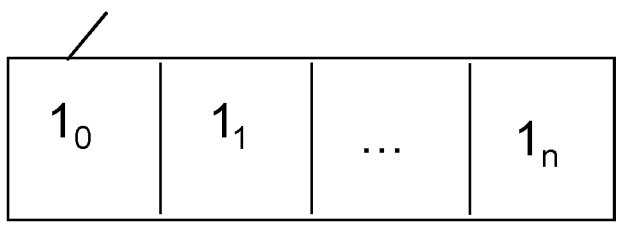
FIG. 3 is a schematic representation of an embodiment of the proposed technology that illustrates a particular time interleaved transmission of multiple anchor carriers.
Figure 3:
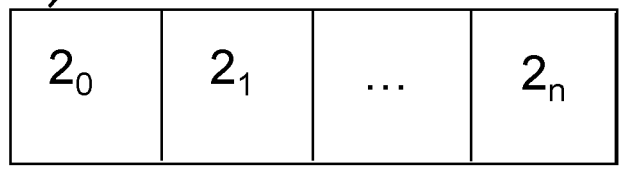
Figure 3:
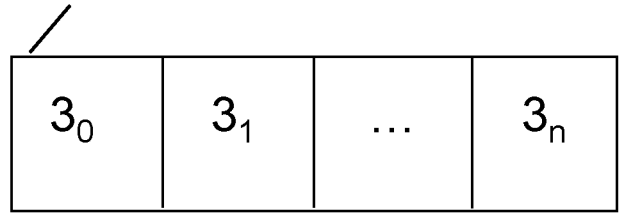
Figure 3:
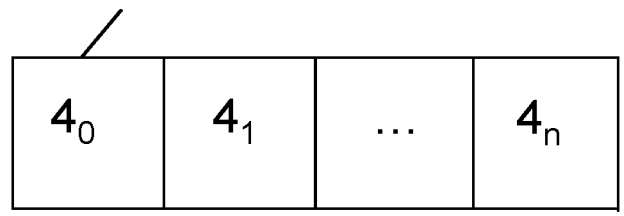

As another concrete example, consider the anchor carrier 1 and anchor carrier 2 in FIG. 3. Assume that sub-frame $1_0$ in the first anchor carrier is allocated for the transmission of a mandatory signal conveying a particular kind of information that is relevant for the basic cell functionality of a first cell, e.g., a synchronization signal. Assume further that the corresponding sub-frame $2_0$ in the second anchor carrier in turn is allocated for the transmission of a mandatory signal conveying a particular kind of information that is relevant for the basic cell functionality of a second cell. The information conveyed by this signal may be synchronization information but might also be any other kind of information that is necessary for the functionality of the second cell. The scheduling method would in this particular case aim to ensure that signals allocated for transmission in sub-frame $1_0$ in the first anchor carrier is transmitted at a different and non-overlapping time compared to the transmission of the signals allocated for transmission in sub-frame $2_0$ in the second anchor carrier. There are several possibilities for achieving this purpose. The sub-frame structure may for example be different for different anchor carriers so as to ensure that the anchor carriers may be transmitted at the same initial time but where the relevant sub-frames are offset, e.g., the relevant sub-frame may correspond to sub-frame $1_0$ in the first anchor carrier and sub-frame $2_1$ in the second anchor carrier. This would ensure that the relevant sub-frames, i.e., those sub-frames that are allocated for transmission of mandatory information, have different transmission times.

Additional examples and explanations of time interleaved transmissions according to the proposed technology will be provided in what follows. The basic mechanism is however to provide a particular scheduling of anchor carrier transmissions that ensures that sub-frames belonging to different anchor carriers and are allocated for mandatory transmissions are transmitted at different and non-overlapping times in order to avoid the momentary power peaks that are associated with a simultaneous transmission and reduce the risk of having radio transmitted signals impaired or corrupted due to the transmission of several anchor carriers.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figures 8A, 8B:
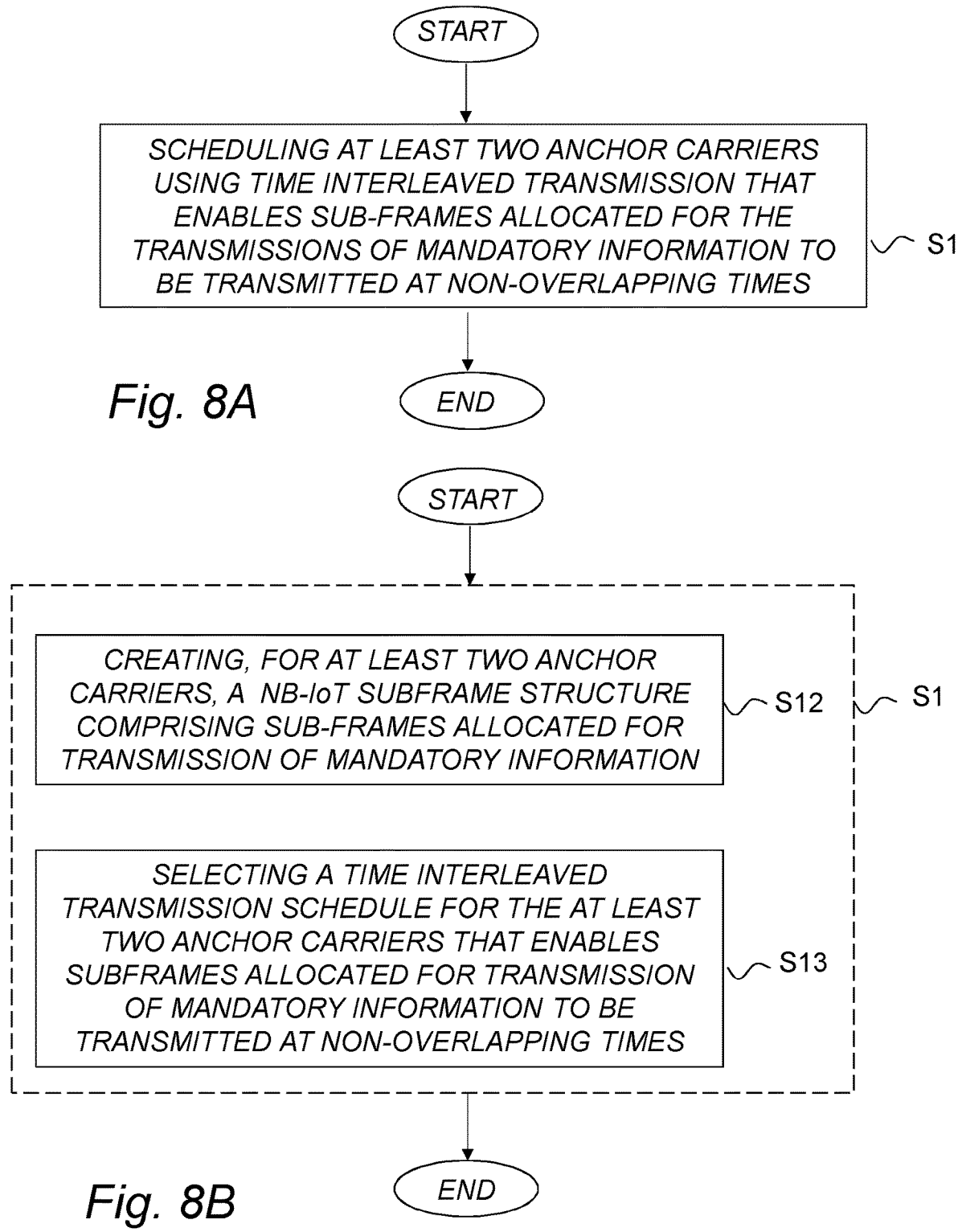
FIG. 8A is a flow diagram illustrating a method according to the proposed technology.
FIG. 8B is a flow diagram illustrating a particular embodiment of a method according to the proposed technology.

According to a particular embodiment of the proposed technology, schematically illustrated in the flow diagram of FIG. 8B, there is provided a method wherein the step S1 of scheduling the at least two cell specific anchor carriers using the time interleaved transmissions comprises creating S12 a NB-IoT sub-frame structure for each of the at least two cell specific anchor carriers, the NB-IoT sub-frame structure comprising NB-IoT sub-frames allocated for the transmission of mandatory information. The method also comprises selecting S13, based on the created NB-IoT sub-frame structure, a time interleaved transmission schedule for the at least two anchor carriers that enables NB-IoT sub-frames belonging to different cell specific anchor carriers and being allocated for the transmission of the mandatory information to be transmitted at non-overlapping times.

Figure 4:
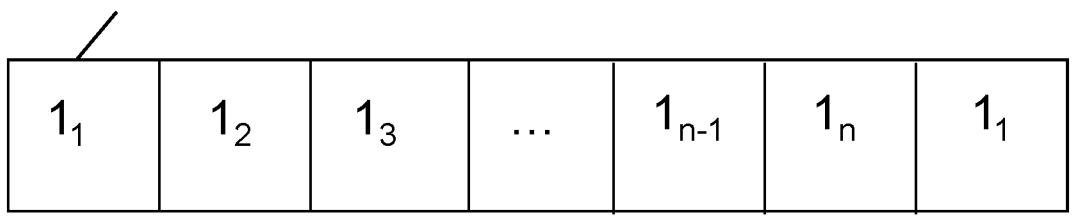
FIG. 4 is a schematic representation of an alternative embodiment of the proposed technology that illustrates a particular time interleaved transmission of multiple anchor carriers.
Figure 4:
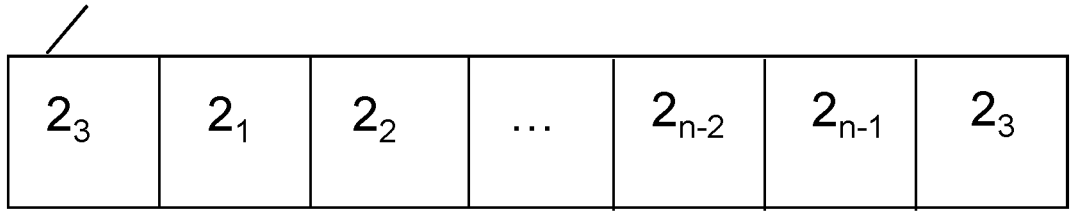
Figure 4:
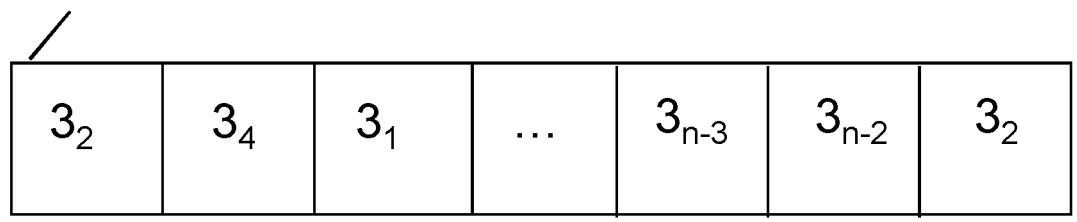
Figure 4:
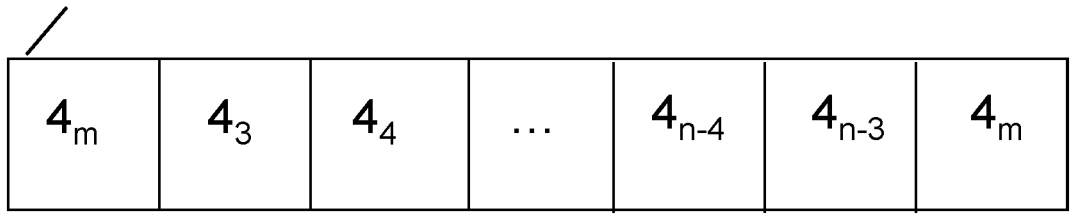

In other words, this embodiment creates a particular sub-frame structure for each of the at least two anchor carriers. The first anchor carrier may for example be provided with a sub-frame structure where the mandatory information are to be transmitted in one, or several, specified sub-frame(s), e.g., sub-frames 0, 2 and 4. The remaining anchor carrier(s) are instead provided with a sub-frame structure, or sub-frame configuration, where the mandatory information are to be transmitted in one, or several, specified sub-frame(s) that differs from the allocated sub-frames in the first anchor carrier. By generating a series of anchor carriers with mutually non-overlapping sub-frames for the mandatory information it is possible to initiate the transmission of all the anchor carriers at the same time since the specific sub-frames allocated for the transmission of mandatory information will be transmitted at non-overlapping times by construction. To further illustrate this embodiment reference is made to FIG. 4. FIG. 4 illustrates a particular example with four anchor carriers. Each of the anchor carrier is given their own specific sub-frame structure specified by the anchor carrier number and an index that refer to a particular signal. The reference $1_1$ thus specifies the first anchor carrier and a first signal or signal type. Assume in this particular example that the index 1 specifies the signal type that convey mandatory information. This would, for FIG. 4, mean that the first anchor carrier has sub-frame 1 allocated for the transmission of mandatory information while anchor carrier 2 has sub-frame 2 allocated for the transmission of mandatory information and anchor carriers 3 and 4 have, respectively, sub-frames 3 and e.g., 4 allocated for the transmission of mandatory information. It is thus possible to generate particular sub-frame patterns that enables mandatory information to be transmitted by different anchor carriers at non-overlapping times, thus avoiding the problems of momentary power load peaks at the transmitting network node.

Figure 9:
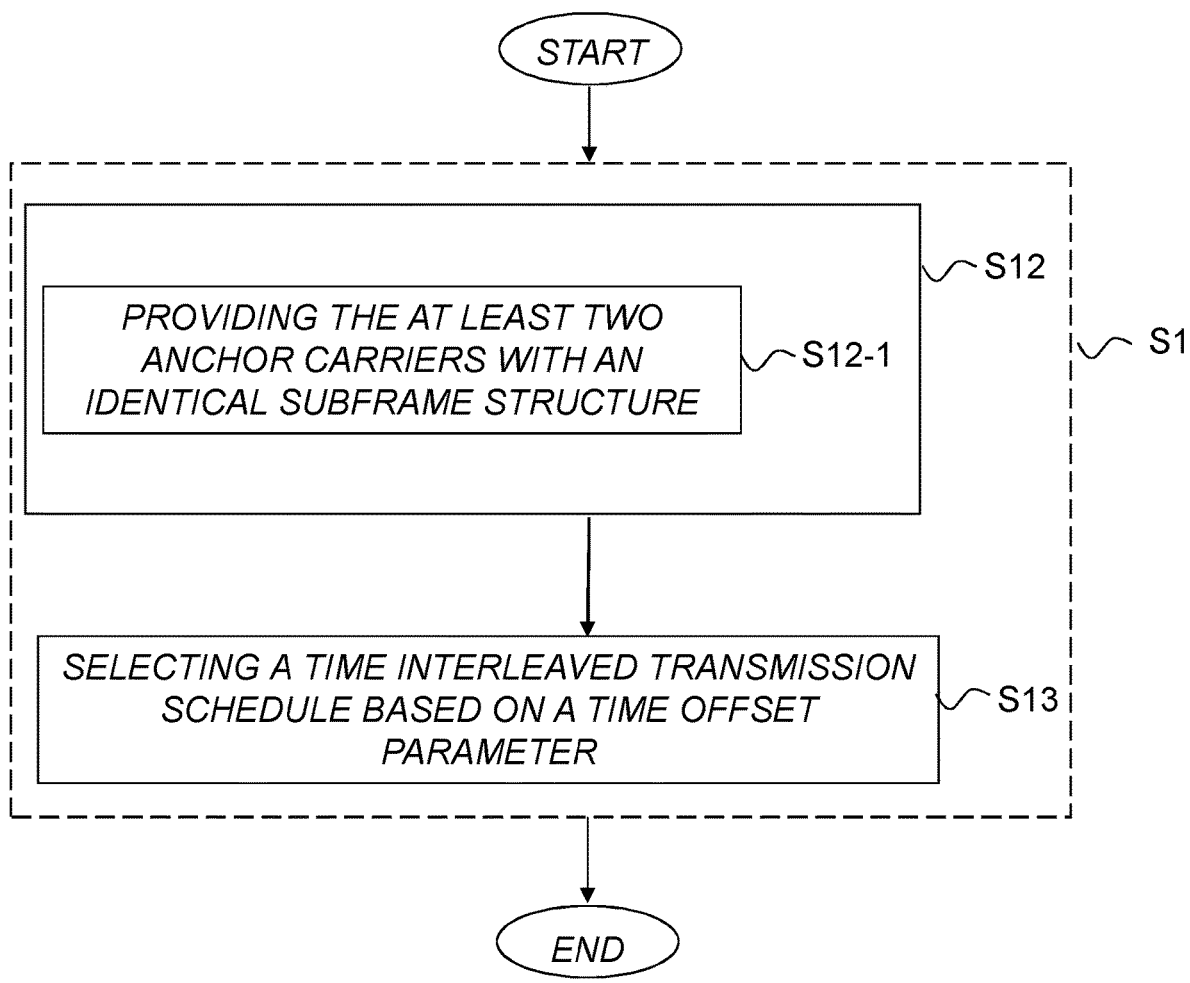
FIG. 9 is a flow diagram illustrating another particular embodiment of a method according to the proposed technology.

According to a specific embodiment of the earlier described method there is provided a method wherein the step S12 of creating a NB-IoT sub-frame structure comprises providing S12-1 each of the at least two cell specific anchor carriers with an identical NB-IoT sub-frame structure, and wherein the step of selecting S13 a time interleaved transmission schedule for the at least two cell specific anchor carriers is based on a time offset parameter specifying the time offset between the transmission of the at least two cell specific anchor carriers. The time offset parameter being selected to ensure that at least the NB-IoT sub-frames belonging to different cell specific anchor carriers, and being allocated for the transmission of mandatory information, are transmitted at non-overlapping times. This embodiment is schematically illustrated in the flow diagram of FIG. 9.

To illustrate this embodiment consider the case where two cell specific anchor carriers has been configured in essentially the same manner, i.e., so that at least the sub-frames that are allocated for transmission of signals carrying mandatory information have an identical mapping in the different anchor carriers. In such a case it is possible to select a time offset parameter that specifies an initial time offset between the initial transmissions of the different anchor carriers. The first anchor carrier 1 may for example be transmitted at an initial time $t_0$ and the second anchor carrier be transmitted at a time $t_0+\Delta t$, where $\Delta t$ is the time offset parameter. The time offset parameter may for example correspond to the length of a sub-frame, e.g., the length of a frame divided by the number of sub-frames within a frame. Such an example of a time interleaved transmission would at least ensure that the relevant sub-frames belonging to different anchor carriers are transmitted at different and non-overlapping times. FIG. 5B provides an illustration of the time offset transmission of two anchor carriers having an identical sub-frame structure. By transmitting the first anchor carrier at time $t_0$ and the second anchor carrier at $t_0+\Delta t$, the time interleaved transmissions will ensure that mandatory information transmitted in sub-frames 0, 4, 5 and 9 are transmitted in a non-overlapping fashion. In this particular example is the mandatory information to be transmitted in NPBCH, SIB1-NB, NPSS and NSSS. The time offset parameter $\Delta t$ is in this particular example selected to correspond to the length of two sub-frames.

To further illustrate this particular embodiment proposed technology we refer to FIG. 3, and consider the case with four anchor carriers having the depicted sub-frame structure, i.e., having identical sub-frame structures. As in the case with merely two anchor carriers it is possible to have an initial time offset between the initial transmissions of the different anchor carriers. The first anchor carrier may for example be transmitted at an initial time $t_0$ and the second anchor carrier be transmitted at a time $t_0+\Delta t$, where $\Delta t$ is the time offset parameter which may, as an example, correspond to the length of a sub-frame, e.g., the length in time of a frame divided by the number of sub-frames within the frame. The third anchor carrier may be transmitted at a time $t_0+2\Delta t$ while the fourth anchor carrier may be transmitted at a time $t_0+3\Delta t$. This would ensure a non-overlapping transmission of the relevant sub-frames $1_0$, $2_0$, $3_0$ and $4_0$ of the respective anchor carriers. It is possible to select different time offset parameters for each anchor carrier as long as one achieves that the sub-frames allocated for the transmission of mandatory information is transmitted at non-overlapping times.

According to still another embodiment of the proposed technology there is provided a method, wherein the step S12 of creating a NB-IoT sub-frame structure is further based on a time window parameter specifying the length of the transmission window for the cell specific anchor carriers and at least one of the following parameters:
a periodicity parameter, specifying how the transmission window is repeated in time; and
a parameter indicating how frequently mandatory information are to be transmitted in each transmission window.

This particular embodiment may be used in a scenario where the mandatory information comprises a System Information Block, SIB, to be transmitted on the NPDSCH. NB-IoT supports a number of SIBs ranging from SIB 1 to SIB 23 that are characterized by the type of information they carry. SIB 1 has its own specific configuration and is transmitted at a fixed schedule and with a specified periodicity and does not, in contrast to the remaining SIBs, use a SI window concept. In order to avoid transmitting time overlapping SIBs it is possible to base the proposed scheduling of the different anchor carriers on a configured periodicity, on a starting offset in each period, on a SI window during which the SIB is sent, and on a parameter that specifies how often or frequently the SIBs should be sent in each SI window. By taking this information into consideration it will be possible to schedule time interleaved transmissions of at least two anchor carriers that will ascertain that SIBs in different anchor carriers are transmitted at non-overlapping times. That is, it is possible to provide a SI scheduling that is coordinated across the cells served by the network node to avoid simultaneous transmission of SIBs. This can, as was explained above, be achieved by coordinating the start offset parameter, the SI window parameter and the SI periodicity parameter across the supported cells.

A particular embodiment of the above method provides a method wherein the step of selecting S13 a time interleaved transmission schedule for the at least two anchor carriers comprises to select a time interleaved transmission schedule that enables time periodically repeating NB-IoT sub-frames belonging to different cell specific anchor carriers, and being allocated for the transmission of the mandatory information, to be transmitted at non-overlapping times.

Consider for example a case where certain sub-frames in an anchor carrier are transmitted with a specified periodicity, i.e., the sub-frames are transmitted at periodically repeating times, e.g., at time $t_0$ and at time $t_0+\Omega$, where $\Omega$ denotes the periodicity—in units of time. In such a case it will be possible to engineer the number of anchor carriers that can be transmitted in an non-overlapping fashion by specifying the periodicity $\Omega$. Consider for example the scenario where a transmission frame comprises N sub-frames and one of these sub-frames, let say the zeroth sub-frame, is allocated for the transmission of mandatory information and where in addition the periodicity $\Omega=0$, i.e., the same anchor carrier is re-transmitted as soon as the transmission frame has ended. In such a scenario it will be possible to transmit N−1 different anchor carriers having identical sub-frame structures such that the relevant sub-frames are non-overlapping by using the time offset scheme described above, i.e., where the first anchor carrier is transmitted at time $t_0$, the second at time $t_0+\Delta t$, the third at $t_0+2\Delta t$, etc. The fact that the first transmitted anchor carrier 1 will be transmitted again as soon as the transmission frame has ended will prohibit a non-overlapping transmission of an N:th anchor carrier since that particular anchor carrier would be transmitted at a time when its zeroth sub-frame could overlap with the transmission of the first sub-frame of the first carrier. A way to increase the number of anchor carriers that can be transmitted in the non-overlapping fashion of the proposed technology is to avoid having identical sub-frame allocations in consecutive transmission frames. This would for example ensure that an N:th anchor carrier could be transmitted in the example above since the zeroth sub-frame of the first anchor carrier would not be allocated for the transmission of mandatory information in the subsequent transmission frame.

Yet another embodiment of the proposed technology provides a method according to wherein the mandatory information to be transmitted at non-overlapping times is transmitted with Orthogonal Frequency-Division Multiplexing modulated, OFDM modulated, signals having a non-Gaussian Peak to Average Power profile, PAPR profile.

Figure 7:
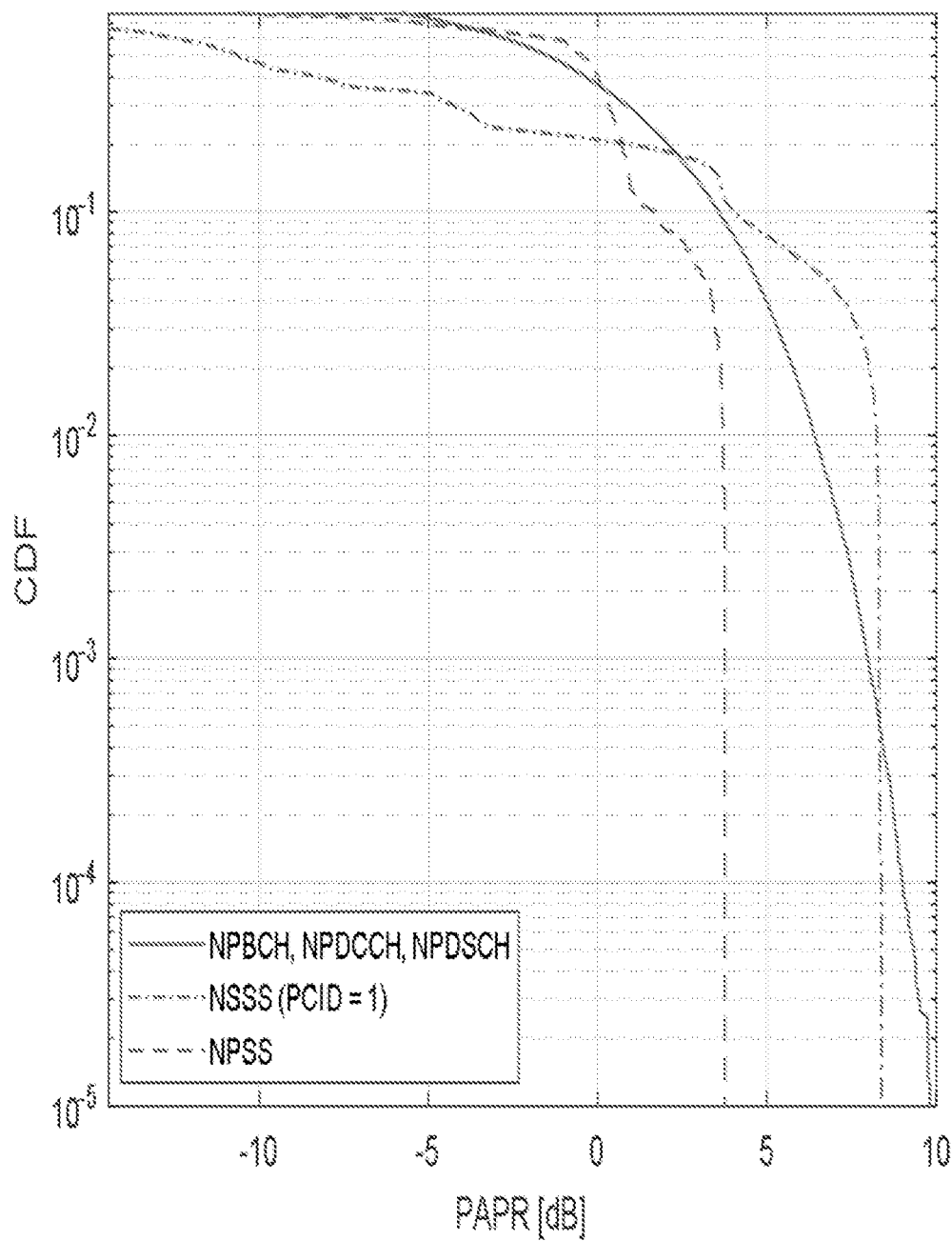
FIG. 7 is a graph illustrating Peak to Average Power Ratio, PAPR, statistics for NPSS, NSSS, NPBCH, NPDCCH and NPDSCH. The NPBCH, NPDCCH and NPDSCH PAPR is following a Gaussian PAPR profile expected for an OFDM carrier, while NPSS and NSSS are defined by the sequence they carry.

To further explain this particular embodiment appreciate that the NB IoT downlink uses OFDM modulation. The waveform is in the frequency domain defined by 12 subcarriers, each of 15 kHz bandwidth. In time domain the transmission is defined by OFDM symbols. 14 consecutive symbols form a sub-frame. Even though OFDM is a spectral efficient modulation, it comes at the cost of a high peak to average power ratio, PAPR. FIG. 7 presents the PAPR statistics of the 5 NB IoT Release 13 downlink signals and channels: NPSS, NSSS, NPBCH, NPDCCH and NPDSCH. Shown is the Cumulative Distribution Function, CDF, of the PAPR of the respective signals and channels. While the NPBCH, NPDCCH and NPDSCH PAPR is following a Gaussian PAPR profile expected for an OFDM carrier, the PAPR of the NPSS and NSSS are defined by the sequences they carry. The NPSS contains a length 11 Zadoff-Zhu sequence that is mapped in frequency over 11 sub-carriers in the last 11 OFDM symbols in sub-frame 5. The NSSS contains a length 131 Zadoff-Zhu sequence that is mapped in frequency and time over the last 11 OFDM symbols in every second sub-frame 9. It is seen that the PAPR of NPSS and NSSS are lower than the PAPR of the NPBCH, NPDCCH and NPDSCH. The proposed technology is well suited for scheduling the transmission of multiple anchor carriers so that mandatory information transmitted with Orthogonal Frequency-Division Multiplexing modulated, OFDM modulated, signals having a non-Gaussian Peak to Average Power profile, PAPR profile are transmitted at non-overlapping times. It is particularly well suited for scenarios when the mandatory information is transmitted with Orthogonal Frequency-Division Multiplexing modulated, OFDM modulated, signals that have a lower Peak to Average Power profile, PAPR profile than the signals transmitted on NPBCH, NPDCCH or NPDSCH.

A scenario where the characteristics of PAPR is used enables a particular application of the scheduling method according to the proposed technology. This application ascertains that different anchor carriers are time interleaved in a manner to avoid simultaneous NPBCH, and SIB1-NB transmissions. FIG. 5C illustrates a scenario with three different anchor carriers where an overlap is only observed for NPSS and SIB1-NB and for NSSS and NPBCH. Thanks to the lower PAPR of the NPSS and NSSS this interleaving scheme will reduce the peak power consumption at the transmitting network node.

By way of example, the proposed technology provides a method wherein the mandatory information to be transmitted at non-overlapping times is comprised in at least one of the following:
a Narrowband Primary Synchronization Signals, NPSS;
a Narrowband Secondary Synchronization Signals, NSSS;
a Master information block transmitted over the Narrowband Physical Broadcast Channel, NPBCH;
a System information block transmitted over the Narrowband Physical Downlink Shared Channel, NPDSCH.

It may in particular be comprised in System information block 1, as was described earlier but there are also possible to provide the information in other System Information Blocks, referred to generally as SIB-X such as SIB-X where X=2, 3, 4, 5, 14, 15, 16, 20, 22, 23. All SIBs are transmitted over the Narrowband Physical Downlink Shared Channel, NPDSCH. Note that among these SIBs, SIB 2 is of special importance it is always sent and can be considered to comprise mandatory information in certain embodiments. The other SIBs can also be treated as comprising mandatory information in certain embodiments but they can also be scheduled if needed.

To improve the system capacity NB-IoT can be configured as a multi-carrier system where the anchor carrier is complemented by a set of non-anchor carriers, each of 200 kHz. The non-anchor carriers support data transmission in RRC_CONNECTED but they also support paging and random access in RRC_IDLE. In the non-anchor carrier downlink typically NPDCCH and NPDSCH transmissions are performed.

According to a particular embodiment of the proposed technology there is provided a method that enables the time interleaved transmissions of the anchor carriers to also be time interleaved with one or several non-anchor carriers. Such an embodiment provides additional mechanism for controlling the power demand of the transmitting nodes and ensures that resources such as modulation and power amplification are free to be used in a controlled fashion, that is, the resources are not saturated due to the transmission of several signals in the same sub-frame.

According to this particular embodiment there is provided a method wherein the multiple carriers further comprises non-anchor carriers having NB-IoT sub-frames dedicated to transmissions of data communication. The method comprises in addition the step S2 of selecting, for at least one non-anchor carrier, a NB-IoT sub-frame configurations whereby transmissions in a subset of the NB-IoT sub-frames is allowed and transmissions in the remaining set of the NB-IoT sub-frames is prohibited. The method also comprises the step S3 of scheduling the at least one non-anchor carrier for time interleaved transmissions whereby at least the selected subset of NB-IoT sub-frames, in which transmissions are allowed, are transmitted at non-overlapping times with the sub-frames of the at least two cell specific anchor carriers that are allocated for the transmission of the mandatory information.

Figure 6:
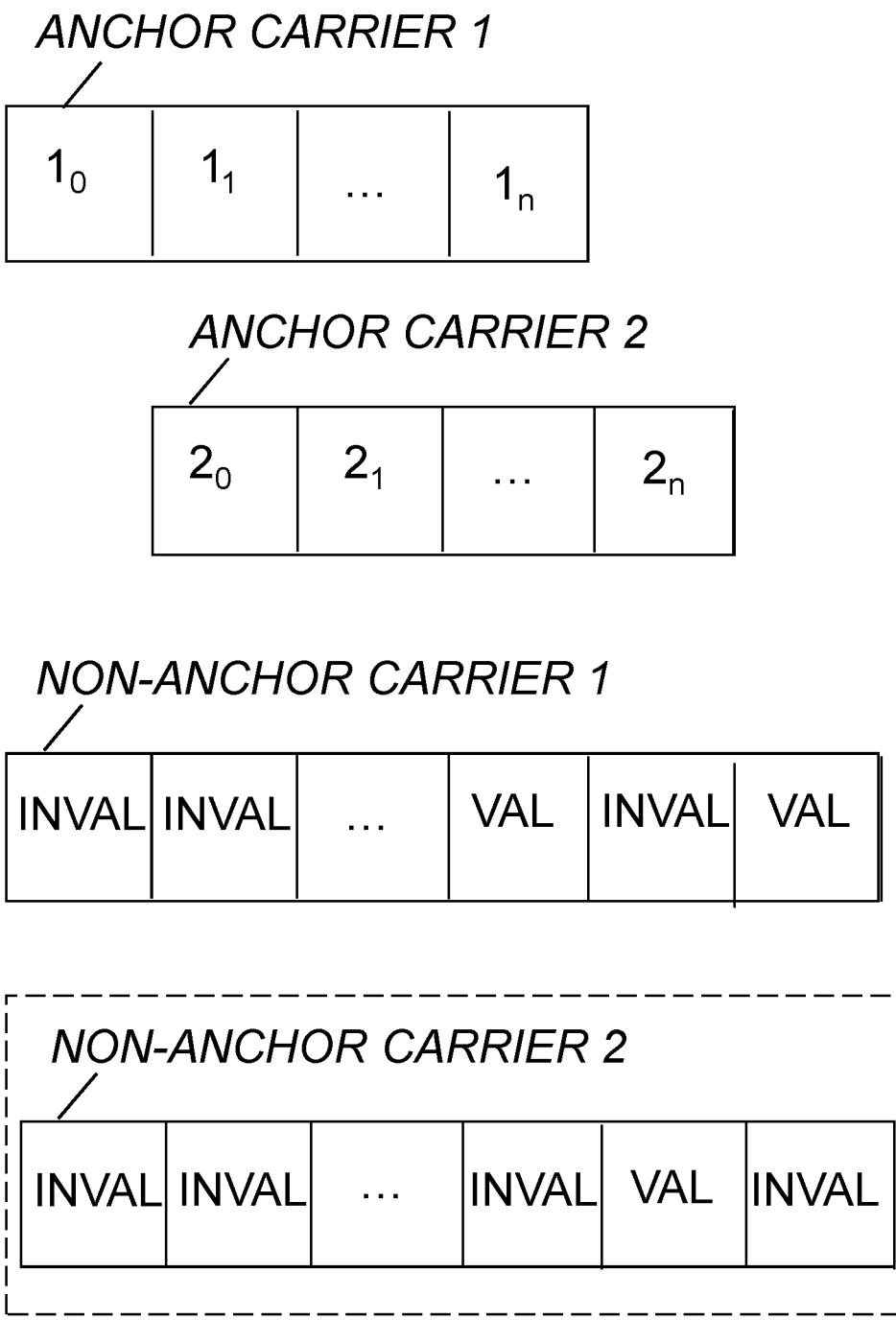
FIG. 6 is a schematic representation of an embodiment of the proposed technology that illustrates a particular time interleaved transmission of two anchor carriers having sub-frames allocated for the transmission of certain signals and one or two non-anchor carriers.

FIG. 6 illustrates a simple example where two anchor carriers, anchor carrier 1 and anchor carrier 2, are configured for a time interleaved transmission whereby sub-frame $2_0$ of the second anchor carrier 2 is transmitted with a time offset from sub-frame $1_0$ of the first anchor carrier 1. In addition a first non-anchor carrier is scheduled for time interleaved transmission with the first and second anchor carrier, in particular so that the sub-frames of the non-anchor carrier are transmitted at different times from the transmission of the sub-frames of the first and second anchor carrier that are allocated for the transmission of mandatory information. In this particular example, assume that the mandatory information of the first and second anchor carrier is transmitted in sub-frames $1_0$ and $2_0$, as illustrated. To ensure that no data is transmitted in a sub-frame of the non-anchor carrier 1 that overlaps in time with sub-frames $1_0$ and $2_0$ of the anchor carriers, the corresponding sub-frames of the non-anchor carrier are selected as sub-frames in which transmissions are prohibited. These sub-frames are denoted INVAL, for invalid, in FIG. 6. The sub-frames that are selected to support transmissions are instead denoted VAL, for valid. It can be seen in FIG. 6 that no time-overlapping transmissions occur during the transmission of mandatory information since the anchor carrier have time interleaved transmissions and the non-anchor carrier is provided with a sub-frame mapping in which the sub-frames that are time overlapping the relevant sub-frames $1_0$ and $2_0$ of the anchor carriers are selected as sub-frames in which transmissions are prohibited.

FIG. 6 also illustrates an optional embodiment with two non-anchor carriers. The above example can be extended to also encompass the use of several non-anchor carriers. To this end it is possible to provide each non-anchor carrier with a specific sub-frame mapping that ensures that no time overlapped transmissions are possible. Consider as an illustration the example in FIG. 6 where a second non-anchor carrier 2 is present. As in the example above, the non-anchor carriers should be furnished with a sub-frame mapping that ensures that no time overlapping transmissions are possible when the mandatory information in the anchor carriers are transmitted. Here, in this example, this means that the first two sub-frames of the first and second non-anchor carrier are selected and declared as sub-frames where transmissions are prohibited, denoted INVAL in FIG. 6. The remaining subframes of the non-anchor carriers may be allocated for the transmission of data traffic, as long as these sub-frames does not overlap with the sub-frames of the anchor carriers that are allocated for the transmission of mandatory information.

The latter scenario may be further improved to ensure that the instant power demand of the transmitting network node is not saturated and that any additional resources, such as modulation and power amplification can be used in a manner that does not compromise the signal quality. To achieve this the remaining sub-frames of the non-anchor carriers may, for example, be given a sub-frame mapping whereby every second sub-frame of the non-anchor carrier is being declared as an invalid sub-frame where no transmissions are allowed. By further offsetting the different non-anchor carriers with a time offset corresponding to the length of a single sub-frame it will be possible to obtain time interleaved non-anchor carriers where a sub-frame of a first non-anchor carrier that is declared as an invalid sub-frame where transmissions are prohibited overlaps in time with a sub-frame in a second non-anchor carrier that is declared as a valid sub-frame where transmissions are allowed. In this manner also the different non-anchor carriers will be scheduled for a time non-overlapping transmission. This together with the fact that the anchor carriers are scheduled for a time non-overlapping transmission of the sub-frames allocated for mandatory information ensures that the resource demands of the network node can be controlled.

According to an embodiment of the proposed technology there is provided a method according, wherein the step S4 of initiating a transmission of at least the cell specific anchor carriers further comprises initiating a transmission of the non-anchor carriers based on the scheduled time interleaved transmission of the non-anchor carriers.

The method is, according to a possible embodiment of the proposed technology, method is performed by a network device 1.

The network device 1 is, according to another possible embodiment of the proposed technology comprised in the single transmitting network node 10; 100. The single transmitting network node 10; 100 may in particular be a network node 10 in a terrestrial network, or a satellite 100 in a non-terrestrial network, serving the multiple NB-IoT cells.

It should be noted that a network node such as a base station can be located in a satellite. It can however also be located on the ground. In such scenarios the satellite receives the network node signal, e.g, the base station signal, and repeats it back to devices on earth.

In the embodiments discussed transmission of mandatory information on different anchor carriers is made on non-overlapping sub-frames. However, in a network node transmitting a high number of anchor carriers it might not be possible to transmit the mandatory information in non-overlapping sub-frames for all anchor carriers. Its transmission should then be distributed over the sub-frames evenly.

Having describe numerous embodiments of the method according to the proposed technology, in the following a description will be given regarding particular devices suitable to perform the method. The advantages and functionalities obtained with the devices correspond to the advantages and functionalities provided by the method and will not be reiterated.

As used herein, the non-limiting terms "wireless communication device", "station", "User Equipment (UE)", and "terminal" or "terminal device" may refer to a mobile phone, a cellular phone, a Personal Digital Assistant (PDA), equipped with radio communication capabilities, a smart phone, a laptop or Personal Computer (PC), equipped with an internal or external mobile broadband modem, a tablet with radio communication capabilities, a target device, a Machine-to-Machine (M2M) device, a Machine Type Communication (MTC) device, an Internet of Thing (IoT) device, a Device-to-Device (D2D) UE, a machine type UE or UE capable of machine to machine communication, Customer Premises Equipment (CPE), Laptop Embedded Equipment (LEE), Laptop Mounted Equipment (LME), USB dongle, a portable electronic radio communication device, and/or a sensor device, meter, vehicle, household appliance, medical appliance, camera, television, radio, lightning arrangement and so forth equipped with radio communication capabilities or the like. In particular, the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

As used herein, the non-limiting term "network node" may refer to base stations, access points, network control nodes such as network controllers, radio network controllers, base station controllers, access controllers, and the like. In particular, the term "base station" may encompass different types of radio base stations including standardized base station functions such as Node Bs, or evolved Node Bs (eNBs), gNodeBs, and also macro/micro/pico radio base stations, home base stations, also known as femto base stations, relay nodes, repeaters, radio access points, Base Transceiver Stations (BTSs), and even radio control nodes controlling one or more Remote Radio Units (RRUs), or the like. A network node may be terrestrial as well as non-terrestrial, a satellite providing an example of a non-terrestrial network node.

As used herein, the term "network device" may refer to any device located in connection with a communication network, including but not limited to devices in access networks, core networks and similar network structures. The term network device may also encompass cloud-based network devices.

It will be appreciated that the methods and arrangements described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to an aspect of the proposed technology there is provided A network device 1 configured to schedule transmissions of multiple carriers from a single transmitting network node 10; 100 for multiple Narrow Band Internet of Things cells (NB-IoT cells) 50, the multiple carriers comprising a respective cell specific anchor carrier having NB-IoT sub-frames allocated for the transmission of mandatory information related to the functionality of the specific cell. The network device 1 is configured to schedule at least two cell specific anchor carriers for time interleaved transmissions that enables NB-IoT sub-frames belonging to different cell specific anchor carriers, and being allocated for the transmission of the mandatory information, to be transmitted at non-overlapping times.

According to an embodiment of the proposed technology there is provided a network device 1 that is configured to schedule the at least two cell specific anchor carriers using the time interleaved transmissions by being configured to create a NB-IoT sub-frame structure for each of the at least two cell specific anchor carriers, the NB-IoT sub-frame structure comprising NB-IoT sub-frames allocated for the transmission of mandatory information, and configured to select, based on the created NB-IoT sub-frame structures, a time interleaved transmission schedule for the at least two cell specific anchor carriers that enables NB-IoT sub-frames belonging to different cell specific anchor carriers, and being allocated for the transmission of the mandatory information, to be transmitted at non-overlapping times.

Yet another embodiment of the proposed technology provides a network device 1 that is configured to create an identical NB-IoT sub-frame structure for each of the at least two cell specific anchor carriers. The network device 1 is also configured to select a time interleaved transmission schedule for the at least two cell specific anchor carriers based on a time offset parameter specifying the time offset between the transmission of the at least two cell specific anchor carriers. The time offset parameter being selected to ensure that at least the NB-IoT sub-frames belonging to different cell specific anchor carriers, and being allocated for the transmission of mandatory information, are transmitted at non-overlapping times.

According to yet another embodiment of the proposed technology there is provided a network device 1 that is further configured to create a NB-IoT sub-frame configuration based on a time window parameter specifying the length of the transmission window and on at least one of the following parameters:
a periodicity parameter, specifying how the transmission window is repeated in time; and a parameter indicating the frequency with which mandatory information are to be transmitted in each transmission window.

A particular embodiment of the proposed technology provides a network device 1 that is configured to select a time interleaved transmission schedule for the at least two cell specific anchor carriers that enables time periodically repeating NB-IoT sub-frames belonging to different cell specific anchor carriers, and being allocated for the transmission of the mandatory information, to be transmitted at non-overlapping times.

By way of example, the proposed technology provides an embodiment of a network device 1 wherein the mandatory information to be transmitted at non-overlapping times is transmitted with Orthogonal Frequency-Division Multiplexing modulated, OFDM modulated, signals having a non-Gaussian Peak to Average Power profile, PAPR profile.

Still another embodiment of the proposed technology provides a network device 1 wherein the mandatory information to be transmitted at non-overlapping times is comprised in at least one of the following:
a Narrowband Primary Synchronization Signals, NPSS;
a Narrowband Secondary Synchronization Signals, NSSS;
a Master information block transmitted over the Narrowband Physical Broadcast Channel, NPBCH;
a System information block transmitted over the Narrowband Physical Downlink Shared Channel, NPDSCH.

It may in particular be comprised in System information block 1, as was described earlier but there are also possible to provide the information in other System Information Blocks, referred to generally as SIB-X such as SIB-X where X=2, 3, 4, 5, 14, 15, 16, 20, 22, 23. All SIBs are transmitted over the Narrowband Physical Downlink Shared Channel, NPDSCH.

Yet another embodiment of the proposed technology provides a network device 1 wherein the multi carriers further comprises non-anchor carriers having NB-IoT sub-frames dedicated to transmissions of data communication, and wherein the network device 1 is configured to select, for at least two one non-anchor carrier, a NB-IoT sub-frame configurations whereby transmissions in a subset of the NB-IoT sub-frames is allowed and transmissions in the remaining set of the NB-IoT sub-frames is prohibited. The network device 1 is also configured to schedule the at least one non-anchor carrier for time interleaved transmissions whereby at least the selected subset of NB-IoT sub-frames, in which transmissions are allowed, are transmitted at non-overlapping times with the sub-frames of the at least two cell specific anchor carriers that are allocated for the transmission of the mandatory information.

The proposed technology provides in addition an embodiment wherein the network device 1 comprises communication circuitry 110 and is configured to initiate a transmission of at least the scheduled cell specific anchor carriers.

The proposed technology also provides a network device 1, wherein the network device 1 comprises communication circuitry 110 and is furthered configured to initiate a transmission of at least one non-anchor carrier based on the scheduled time interleaved transmission of the at least one non-anchor carrier.

In the embodiments discussed transmission of mandatory information on different anchor carriers is made on non-overlapping sub-frames. However, in a network node transmitting a high number of anchor carriers it might not be possible to transmit the mandatory information in non-overlapping sub-frames for all anchor carriers. Its transmission should then be distributed over the sub-frames evenly.

Figure 10:
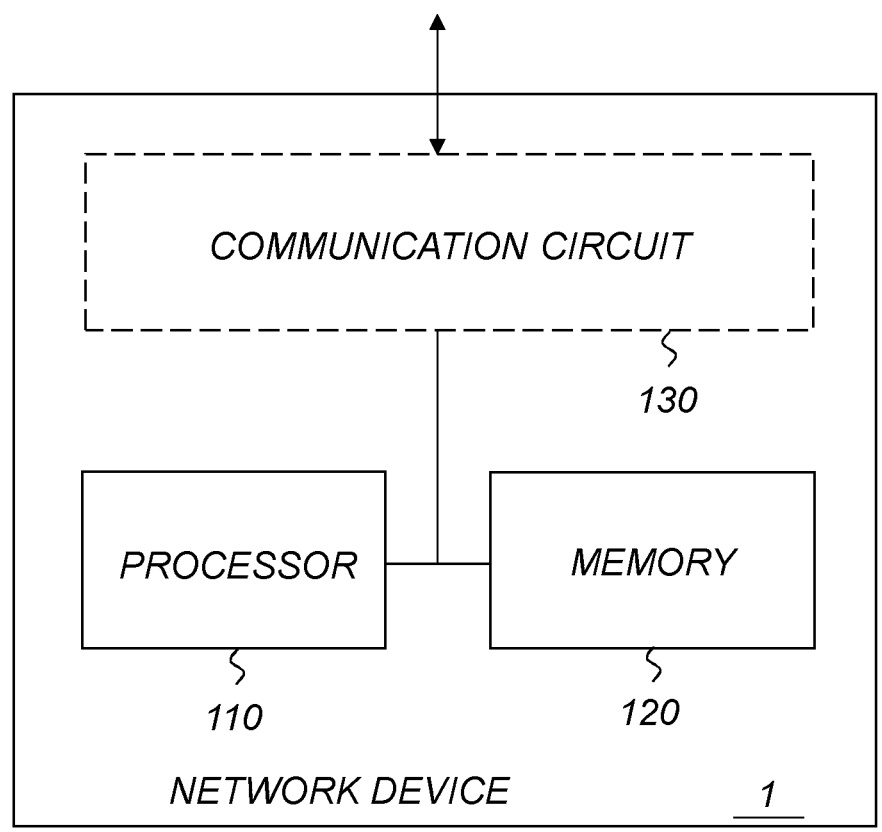
FIG. 10 is a block diagram illustrating a network device according to the proposed technology.

Yet another embodiment of the proposed network device 1 is illustrated in FIG. 10. The network device 1 comprises communication circuitry 130 and the network device is furthered configured to initiate a transmission of the non-anchor carriers. The communication circuit 130 may include functions for wired and/or wireless communication with other devices and/or network nodes in the network. In a particular example, the communication circuit 130 may be based on radio circuitry for communication with one or more other nodes, including transmitting and/or receiving information. The communication circuit 130 may in turn be interconnected to the processor 110 and/or memory 120. The communication circuit 230 may be interconnected to the hardware circuitry 210 and/or REG/MEM 220. By way of example, the communication circuit 130; 230 may include any of the following: a receiver, a transmitter, a transceiver, input/output (I/O) circuitry, input port(s) and/or output port(s).

The network device 1 is, according to a possible embodiment, comprised in a single transmitting network node 10; 100. This embodiment is schematically illustrated in FIG. 11B.

The network device 1 may, according to a particular embodiment, be comprised in a transmitting network node 10; 100 that is a network node 10 in a terrestrial network, or a satellite 100 in a non-terrestrial network, serving the multiple NB-IoT cells.

A particular embodiment of the proposed network device is illustrated in FIG. 10. The network device 1 comprises processing circuitry 110 and memory 120, wherein the memory 120 comprises instructions executable by the processing circuitry 110, whereby the processing circuitry is operative to schedule the transmissions of multi carriers to multiple Narrow Band Internet of Things cells, NB-IoT cells.

Figure 11A:
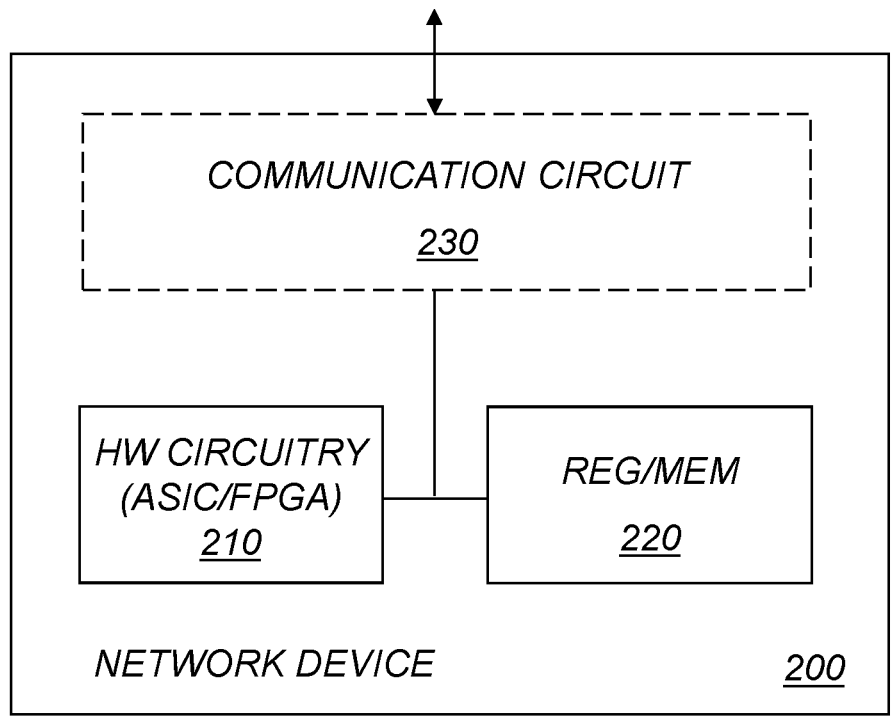
FIG. 11A is a block diagram illustrating a particular embodiment of a network device according to the proposed technology.
Figure 11B:
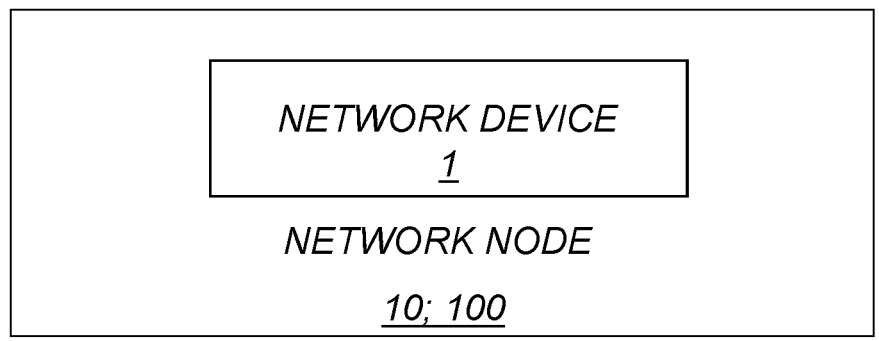
FIG. 11B is a block diagram illustrating a network device according to the proposed technology when arranged in a network node.

FIG. 11A is a schematic block diagram illustrating another example of a network device 1, based on a hardware circuitry implementation according to an embodiment. Particular examples of suitable hardware circuitry 210 include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG) and/or memory units (MEM) 220.

It is also possible to provide a solution based on a combination of hardware and software. The actual hardware-software partitioning can be decided by a system designer based on a number of factors including processing speed, cost of implementation and other requirements.

Figure 12:
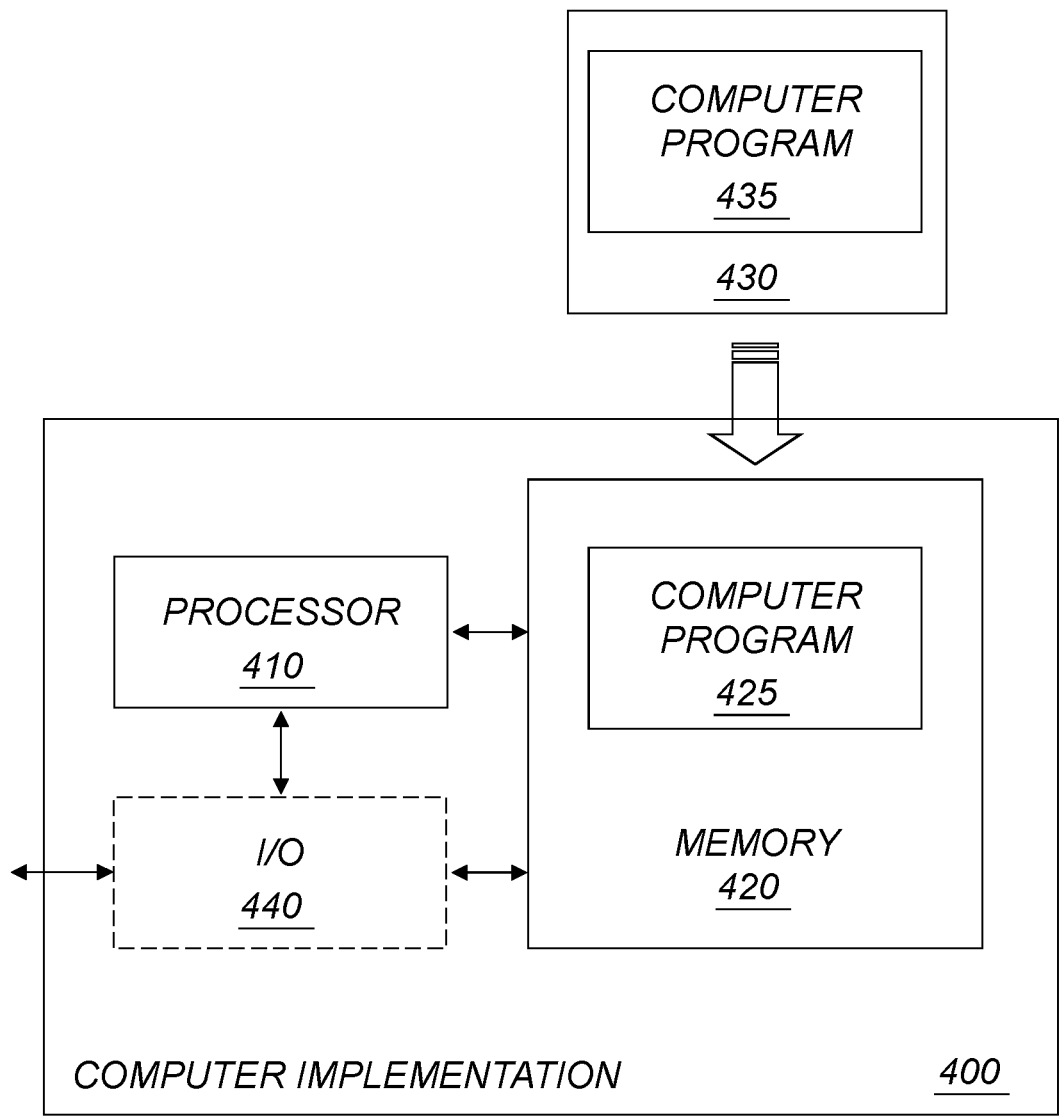
FIG. 12 is a block diagram illustrating a computer program implementation of a computer program according to the proposed technology.

FIG. 12 is a schematic diagram illustrating an example of a computer-implementation 400 according to an embodiment. In this particular example, at least some of the steps, functions, procedures, modules and/or blocks described herein are implemented in a computer program 425; 435, which is loaded into the memory 420 for execution by processing circuitry including one or more processors 410. The processor(s) 410 and memory 420 are interconnected to each other to enable normal software execution. An optional input/output device 440 may also be interconnected to the processor(s) 410 and/or the memory 420 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 410 is thus configured to perform, when executing the computer program 425, well-defined processing tasks such as those described herein.

The processing circuitry does not have to be dedicated to only execute the above-described steps, functions, procedure and/or blocks, but may also execute other tasks.

In a particular embodiment, there is provided a computer program 425; 435 for scheduling transmissions of multiple carriers from a single transmitting network node 10; 100 for multiple Narrow Band Internet of Things (NB-IoT) cells, 50. The multiple carriers comprising a respective cell specific anchor carrier having NB-IoT sub-frames allocated for the transmission of mandatory information related to the functionality of the specific cell, wherein the computer program 425; 435 comprises instructions, which when executed by at least one processor 410, cause the at least one processor 410 to schedule at least two cell specific anchor carriers using time interleaved transmissions that enables NB-IoT subframes belonging to different cell specific anchor carriers and being allocated for the transmission of the mandatory information to be transmitted at non-overlapping times.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 425; 435 may be realized as a computer program product, which is normally carried or stored on a computer-readable medium 420; 430, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The network device of the proposed technology may be any suitable network device in the wireless communication system, or a network device in connection with the wireless communication system. By way of example, the network device may be a suitable network node such a base station or an access point. However, the network device may alternatively be a cloud-implemented network device.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

The proposed technology have at least some functionalities that may be handled in the cloud. It is for example possible to determine the particular scheduling of the time interleaved transmissions in the cloud or the virtual domain and then inform the transmitting network node of the decision of how the mandatory information is to be scheduled over time may for different anchor carriers to ensure that at least the mandatory information may be transmitted so as to avoid time overlaps during transmission. The cloud based functionality may also be responsible for scheduling the non-anchor carriers according to the scheme described earlier. The cloud based device may thus determine the potentially computation demanding scheduling scheme for the various embodiments that are described herein and provide the transmitting network node 10; 100 with the determined schedule.

There are different forms of virtualization that can be useful in this context, including one or more of:

- Consolidation of network functionality into virtualized software running on customized or generic hardware. This is sometimes referred to as network function virtualization.
- Co-location of one or more application stacks, including operating system, running on separate hardware onto a single hardware platform. This is sometimes referred to as system virtualization, or platform virtualization.
- Co-location of hardware and/or software resources with the objective of using some advanced domain level scheduling and coordination technique to gain increased system resource utilization. This is sometimes referred to as resource virtualization, or centralized and coordinated resource pooling.

By way of example, Software Defined Networking (SDN) concerns the separation of the control and user plane of today's routers and switches. The user plane processing (e.g. filtering) and packet forwarding is in most cases performed in hardware by a switch which is controlled by a (centralized) SDN controller implemented in software. The SDN controller can update rules for packet processing and forwarding in the controlled switches e.g. using protocols such as OpenFlow. This makes it possible to gradually add more advanced functions to the network by updating the SDN controller. SDN can be seen as a lower level of separation of control and user plane compared to the separation of control and user plane nodes between Mobility Management Entities (MME) and Serving Gateway (S-GW) in System Architecture Evolution (SAE) and/or Long Term Evolution (LTE).

There is simultaneously a trend leading to consolidation of network functionality into virtualized software running on generic hardware in data centers. This trend is an operator driven forum known as Network Functions Virtualization (NFV) and aims to take specialized functionality like the functions performed by the mobile packet core such as packet inspection, firewall services, and specialized packet filtering (Quality-of-Service differentiation) and implement them in software running on generic hardware that is configured to orchestrate the required network functionality.

Storage and processing of large amount of data (a.k.a. Big Data) is becoming more and more important, even in real-time applications. Storing and processing of large and complex data from e.g. sensors and devices in the networked society often require distributed systems for analytics, collection, search, sharing, storage, transfer, anonymization and virtualization. While, for instance, data analytics as such is not a cloud technology, its implementation often is, especially if the data handled is large.

Distributed, large scale processing on commodity hardware often involves technologies for storage and processing on clusters of commodity hardware.

Although it may often desirable to centralize functionality in so-called generic data centers, in other scenarios it may in fact be beneficial to distribute functionality over different parts of the network.

Figure 13:
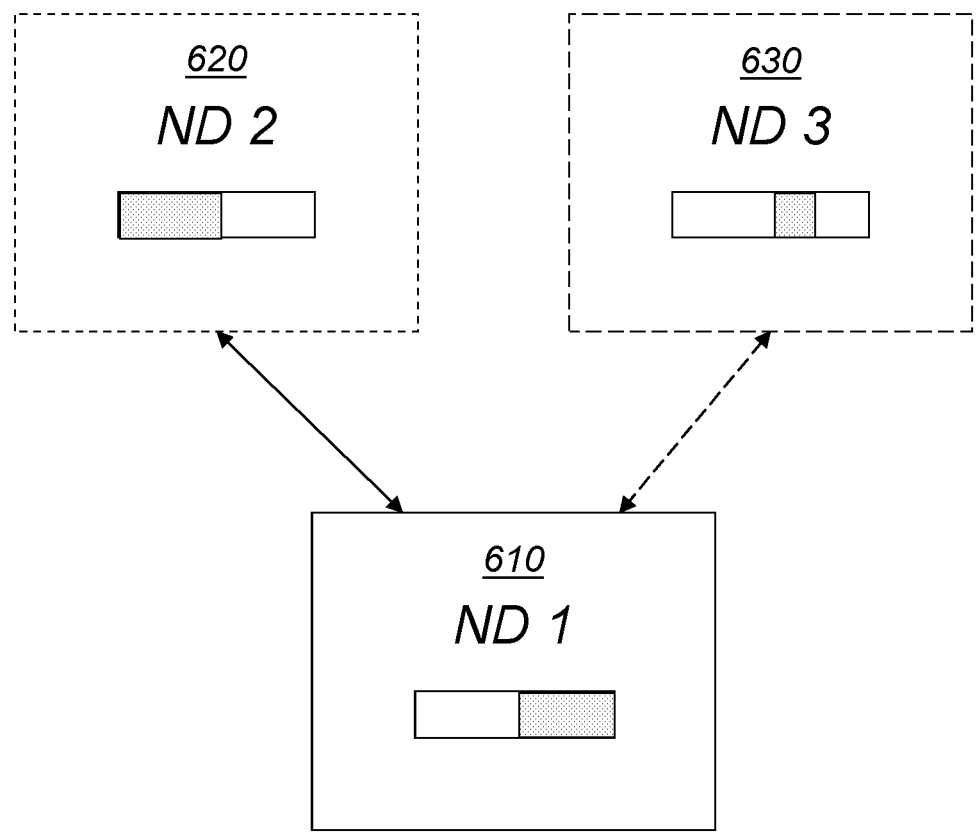
FIG. 13 is a schematic diagram illustrating an example of how functionality can be distributed or partitioned between different network devices

FIG. 13 is a schematic diagram illustrating an example of how the functionality of the proposed technology can be distributed or partitioned between different network devices in a general case. In this example, there are at least two individual, but interconnected network devices, ND1 and ND2, with reference numerals 610 and 620, respectively, which may have different functionalities, or parts of the same functionality, partitioned between the network devices 610 and 620. There may be additional network devices, such as ND3, with reference numeral 630, being part of such a distributed implementation. The network devices 610-630 may be part of the same wireless communication system, or one or more of the network devices may be so-called cloud-based network devices located outside of the wireless communication system. The cooperating network devices, ND1, ND2 and ND3, or a single one of these, may perform various tasks that enables the determination of schedule for time interleaved transmissions that will ensure time interleaved transmissions of NB-IoT sub-frames belonging to different cell specific anchor carriers, and being allocated for the transmission of mandatory information, to be transmitted at non-overlapping times.

Figure 14:
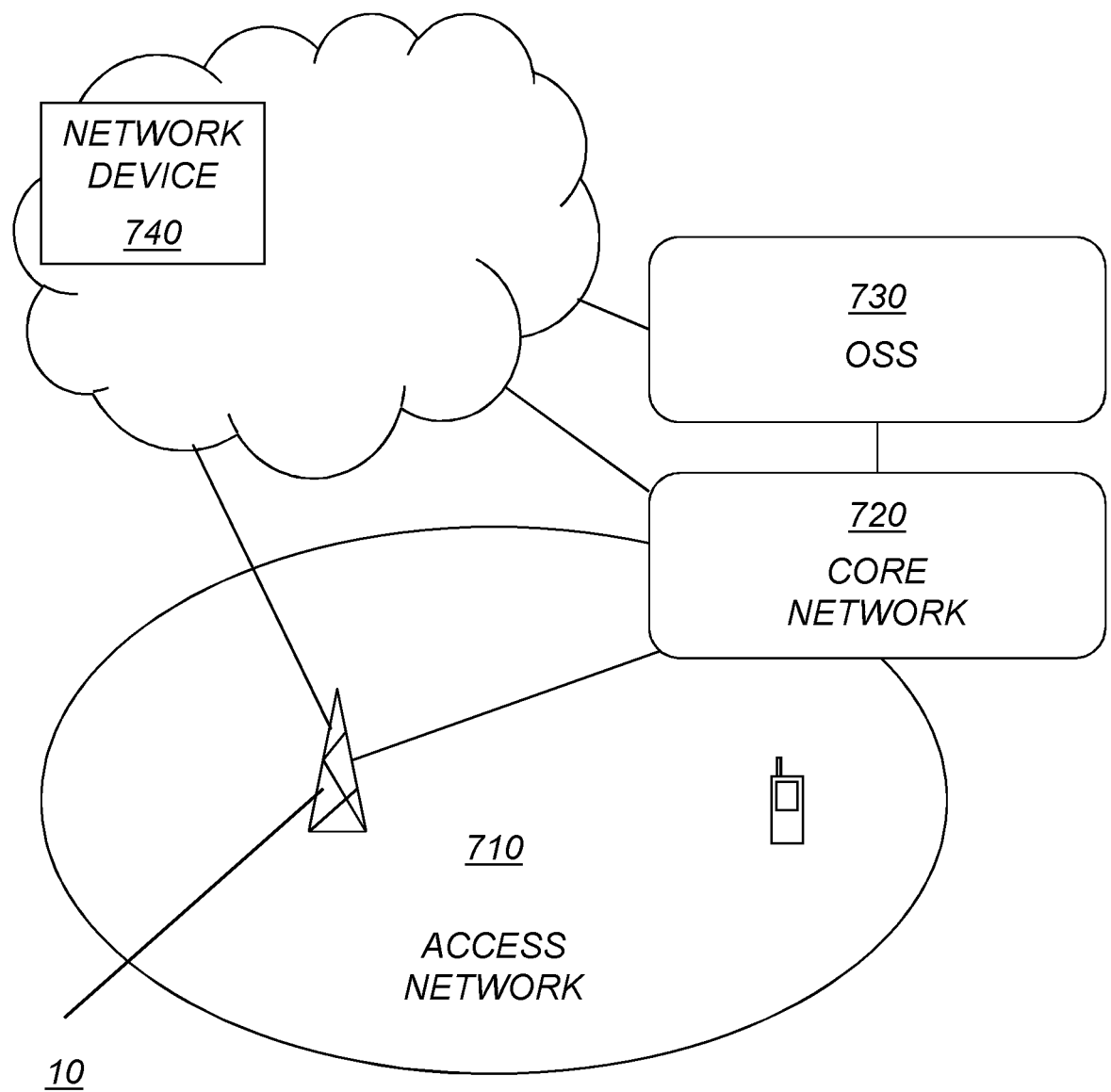
FIG. 14 is a schematic diagram illustrating an example of a wireless communication system, including an access network and/or a core network and/or an Operations and Support System (OSS), in cooperation with one or more cloud-based network devices.

FIG. 14 is a schematic diagram illustrating an example of a wireless communication system, including an access network 710 and/or a core network 720 and/or an Operations and Support System (OSS), 730 in cooperation with one or more cloud-based network devices 740. Functionality relevant for the access network 710 and/or the core network 720 and/or the OSS system 730 may be at least partially implemented for execution in a cloud-based network device 740, with suitable transfer of information between the cloud-based network device and the relevant network nodes and/or communication units in the access network and/or the core network and/or the OSS system. According to the proposed technology it is possible for a cloud-based network device 740 to determine a schedule for time interleaved transmissions that will ensure that time interleaved transmissions of NB-IoT sub-frames belonging to different cell specific anchor carriers, and being allocated for the transmission of mandatory information, are transmitted at non-overlapping times. The cloud-based network device 740 may then inform the transmitting network node 100 of the determined scheduling. The cloud-based network device 740 may provide the information to the transmitting network node 10 either directly or through functionalities in the core network 720 and/or the Operations and Support System (OSS), 730.

A Network Device (ND) as described above may thus generally be seen as an electronic device being communicatively connected to other electronic devices in the network. By way of example, the network device may be implemented in hardware, software or a combination thereof. For example, the network device may be a special-purpose network device or a general purpose network device, or a hybrid thereof. A special-purpose network device may use custom processing circuits and a proprietary operating system (OS), for execution of software to provide one or more of the features or functions disclosed herein. It may in particular be suitable for the determination of a schedule for time interleaved transmissions that will ensure that time interleaved transmissions of NB-IoT sub-frames belonging to different cell specific anchor carriers, and being allocated for the transmission of mandatory information, are transmitted at non-overlapping times. This determined schedule may then be conveyed to a transmitting network node 10; 100 to enable the network node to transmit the anchor carriers according to the determined schedule. A general purpose network device may instead use common off-the-shelf (COTS) processors and a standard OS, for execution of software configured to provide at least the scheduling functions described above.

By way of example, a special-purpose network device as above may include hardware comprising processing or computing resource(s), which typically include a set of one or more processors, and physical network interfaces (Nis), which sometimes are called physical ports, as well as non-transitory machine readable storage media having stored thereon software. A physical NI may be seen as hardware in a network device through which a network connection is made, e.g. wirelessly through a wireless network interface controller (WNIC) or through plugging in a cable to a physical port connected to a network interface controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device as above may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system. A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a network device that is configured to determine a schedule for time interleaved transmissions that will ensure that time interleaved transmissions of NB-IoT sub-frames belonging to different cell specific anchor carriers, and being allocated for the transmission of mandatory information, are transmitted at non-overlapping times. The network device is, in this embodiment, a hybrid network device. A hybrid network device includes both custom processing circuitry/proprietary OS and COTS processors/standard OS in a network device, e.g. in a card or circuit board within a network device ND. In certain embodiments of such a hybrid network device, a platform Virtual Machine (VM), such as a VM that implements functionality of a special-purpose network device, could provide for para-virtualization to the hardware present in the hybrid network device. This network device may, as in the earlier described embodiments, be configured to convey the determined schedule to a transmitting network node 10; 100.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

The invention claimed is:

1. A method for scheduling transmissions of multiple carriers from a single transmitting network node for multiple Narrow Band Internet of Things (NB-IoT) cells, the multiple carriers comprising a respective cell specific anchor carrier having NB-IoT sub-frames allocated for the transmission of mandatory information related to the functionality of the specific cell, the method comprising:
    scheduling at least two cell specific anchor carriers using time interleaved transmissions that enables NB-IoT sub-frames belonging to different cell specific anchor carriers, and being allocated for the transmission of the mandatory information, to be transmitted at non-overlapping times.

2. The method of claim 1, wherein the scheduling comprises:
    creating a NB-IoT sub-frame structure for the at least two cell specific anchor carriers, the NB-IoT sub-frame structure comprising NB-IoT sub-frames allocated for the transmission of mandatory information; and selecting, based on the created NB-IoT sub-frame structures, a time interleaved transmission schedule for the at least two anchor carriers that enables NB-IoT sub-frames belonging to different cell specific anchor carriers, and being allocated for the transmission of the mandatory information, to be transmitted at non-overlapping times.

3. The method of claim 2:
wherein the creating the NB-IoT sub-frame structure comprises providing each of the at least two cell specific anchor carriers with an identical NB-IoT sub-frame structure; and
wherein the selecting a time interleaved transmission schedule for the at least two cell specific anchor carriers is based on a time offset parameter specifying a time offset between the transmission of the at least two cell specific anchor carriers, the time offset parameter being selected to ensure that at least the NB-IoT sub-frames belonging to different cell specific anchor carriers, and being allocated for the transmission of mandatory information, are transmitted at non-overlapping times.

4. The method of claim 2, wherein the creating the NB-IoT sub-frame structure is based on a time window parameter specifying a length of a transmission window for the cell specific anchor carriers and:
a periodicity parameter, specifying how the transmission window is repeated in time; and/or
a parameter indicating the frequency with which mandatory information are to be transmitted in each transmission window.

5. The method of claim 4, wherein the selecting a time interleaved transmission schedule for the at least two anchor carriers comprises selecting a time interleaved transmission schedule that enables time periodically repeating NB-IoT sub-frames belonging to different cell specific anchor carriers, and being allocated for the transmission of the mandatory information, to be transmitted at non-overlapping times.

6. The method of claim 1, wherein the mandatory information to be transmitted at non-overlapping times is transmitted with Orthogonal Frequency-Division Multiplexing (OFDM) modulated signals having a non-Gaussian Peak to Average Power profile.

7. The method of claim 1, wherein the mandatory information to be transmitted at non-overlapping times is comprised in:
Narrowband Primary Synchronization Signals;
Narrowband Secondary Synchronization Signals;
Master information block transmitted over a Narrowband Physical Broadcast Channel;
System information block transmitted over a Narrowband Physical Downlink Shared Channel.

8. The method of claim 1:
wherein the multiple carriers further comprise non-anchor carriers having NB-IoT sub-frames dedicated to transmissions of data communication;
wherein the method further comprises:
selecting, for at least one non-anchor carrier, a NB-IoT sub-frame configuration whereby transmissions in a subset of the NB-IoT sub-frames is allowed and transmissions in the remaining set of the NB-IoT sub-frames is prohibited; and
scheduling the at least one non-anchor carrier for time interleaved transmissions whereby at least the selected subset of NB-IoT sub-frames, in which transmissions are allowed, are transmitted at non-overlapping times with the sub-frames of the at least two cell specific anchor carriers that are allocated for the transmission of the mandatory information.

9. The method of claim 1, further comprising initiating a transmission of at least the cell specific anchor carriers based on the scheduled time interleaved transmission.

10. The method of claim 8, further comprising:
initiating a transmission of at least the cell specific anchor carriers based on the scheduled time interleaved transmission;
wherein the initiating the transmission comprises initiating a transmission of the at least one non-anchor carrier based on the scheduled time interleaved transmission of the at least one non-anchor carrier.

11. The method of claim 1, wherein the method is performed by a network device.

12. The method of claim 11, wherein the network device is comprised in the single transmitting network node.

13. The method of claim 12, wherein the single transmitting network node is a network node in a terrestrial network, or a satellite in a non-terrestrial network, serving the multiple NB-IoT cells.

14. A network device configured to schedule transmissions of multiple carriers from a single transmitting network node for multiple Narrow Band Internet of Things cells (NB-IoT cells), the multiple carriers comprising a respective cell specific anchor carrier having NB-IoT sub-frames allocated for the transmission of mandatory information related to the functionality of the specific cell; the network device comprising:
processing circuitry;
memory containing instructions executable by the processing circuitry whereby the network device is operative to:
schedule at least two cell specific anchor carriers for time interleaved transmissions that enables NB-IoT sub-frames belonging to different cell specific anchor carriers, and being allocated for the transmission of the mandatory information, to be transmitted at non-overlapping times.

15. The network device of claim 14, wherein the instructions are such that the network device is operative to:
create a NB-IoT sub-frame structure for each of the at least two cell specific anchor carriers, the NB-IoT sub-frame structure comprising NB-IoT sub-frames allocated for the transmission of mandatory information; and
select, based on the created NB-IoT sub-frame structures, a time interleaved transmission schedule for the at least two cell specific anchor carriers that enables NB-IoT sub-frames belonging to different cell specific anchor carriers, and being allocated for the transmission of the mandatory information, to be transmitted at non-overlapping times.

16. The network device of claim 15, wherein the instructions are such that the network device is operative to:
create an identical NB-IoT sub-frame structure for each of the at least two cell specific anchor carriers; and
select a time interleaved transmission schedule for the at least two cell specific anchor carriers based on a time offset parameter specifying a time offset between the transmission of the at least two cell specific anchor carriers, the time offset parameter being selected to ensure that at least the NB-IoT sub-frames belonging to different cell specific anchor carriers, and being allocated for the transmission of mandatory information, are transmitted at non-overlapping times.

17. The network device of claim 15, wherein the instructions are such that the network device is operative to create a NB-IoT sub-frame configuration based on a time window parameter specifying the length of the transmission window and:
- a periodicity parameter, specifying how the transmission window is repeated in time; and/or
- a parameter indicating the frequency with which mandatory information are to be transmitted in each transmission window.

18. The network device of claim 17, wherein the instructions are such that the network device is operative to select a time interleaved transmission schedule for the at least two cell specific anchor carriers that enables time periodically repeating NB-IoT sub-frames belonging to different cell specific anchor carriers, and being allocated for the transmission of the mandatory information, to be transmitted at non-overlapping times.

19. The network device of claim 14, wherein the mandatory information to be transmitted at non-overlapping times is transmitted with Orthogonal Frequency-Division Multiplexing (OFDM) modulated signals having a non-Gaussian Peak to Average Power profile.

20. A non-transitory computer readable recording medium storing a computer program product for controlling a network device for scheduling transmissions of multiple carriers from a single transmitting network node for multiple Narrow Band Internet of Things cells (NB-IoT cells), the multiple carriers comprising a respective cell specific anchor carrier having NB-IoT sub-frames allocated for the transmission of mandatory information related to the functionality of the specific cell; the computer program product comprising program instructions which, when run on processing circuitry of the network device, causes the network device to:
- schedule at least two cell specific anchor carriers for time interleaved transmissions that enables NB-IoT sub-frames belonging to different cell specific anchor carriers, and being allocated for the transmission of the mandatory information, to be transmitted at non-overlapping times.

* * * * *